(12) United States Patent
Kimura et al.

(10) Patent No.: US 7,167,932 B2
(45) Date of Patent: Jan. 23, 2007

(54) SYSTEM AND METHOD FOR DMA DATA TRANSFERRING APPARATUS AND LIQUID EJECTION APPARATUS

(75) Inventors: Masahiro Kimura, Suwa (JP);
Yasunori Fukumitsu, Suwa (JP);
Yasuhisa Yamamoto, Suwa (JP);
Masahiro Igarashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 10/649,296

(22) Filed: Aug. 26, 2003

(65) Prior Publication Data

US 2004/0083313 A1 Apr. 29, 2004

(30) Foreign Application Priority Data

Aug. 26, 2002 (JP) .............................. 2002-245324
Jun. 19, 2003 (JP) .............................. 2003-175095

(51) Int. Cl.
*G06F 13/00* (2006.01)
*H04N 7/12* (2006.01)

(52) U.S. Cl. .............................. 710/22; 710/35; 347/1; 375/240.19; 382/113; 382/232; 382/239; 358/1.16

(58) Field of Classification Search .................. 710/22, 710/35; 347/1; 375/240.19; 382/113, 232, 382/239; 358/1.16
See application file for complete search history.

(56) References Cited

U.S. PATENT DOCUMENTS 5,533,175 A * 7/1996 Lung et al. ................. 358/1.16
5,937,152 A * 8/1999 Oda et al. ................... 358/1.16
6,167,091 A 12/2000 Okada et al.
6,819,322 B1 * 11/2004 Emerson et al. ............. 345/520
2001/0043723 A1 * 11/2001 Kadota et al. ............... 382/113
2003/0081244 A1 * 5/2003 Clouthier et al. ........... 358/1.15

FOREIGN PATENT DOCUMENTS

EP 0 802 503 A2 10/1997
EP 1 079 326 A2 2/2001
JP 3251053 12/1993

OTHER PUBLICATIONS

Tanenbaum, Andrew, Structured Computer Organization 3rd Ed, pp. 11-13, Copyright 1990.*
Office Communication dated Nov. 14, 2005.
Chinese Office Action dated Dec. 24, 2004 (along with English translation thereof).

* cited by examiner

*Primary Examiner*—Tammara Peyton
(74) *Attorney, Agent, or Firm*—John J. Penny, Jr.; Edwards Angell Palmer & Dodge LLP

(57) ABSTRACT

Compressed recording data is DMA-transferred to a receiving buffer unit via a system bus one word each. It is DMA-transferred from the receiving buffer unit to a DECU via the system bus. It is developed based on hardware by a decode circuit in the DECU, and stored in a line buffer. It is DMA-transferred to a local memory via a local bus when it reaches predetermined bytes. The recording data stored in the local memory is DMA-transferred to the DECU via the local bus, DMA-transferred to a head controlling unit and DMA-transferred to a recording head.

14 Claims, 36 Drawing Sheets

SETTING CONDITION
NO VERTICAL LINE REARRANGEMENT
TOTAL NUMBER OF DEVELOPED BYTES: 64 BYTES (16×4)
NUMBER OF BYTES IN 1 LINE: 16 BYTES
NUMBER OF DEVELOPED LINES: 4 LINES

LOCAL MEMORY

*FIG. 9A*  D1→

| 01 01 | 01 02 | 78 55 | 44 FF |
|---|---|---|---|
| FF FF | FF FF | FF 11 | 11 11 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

*FIG. 9B*

| 01 01 | 01 02 | 78 55 | 44 FF |
|---|---|---|---|
| FF FF | FF FF | FF 11 | 11 11 |
| 66 12 | 77 45 | 89 10 | 55 10 |
| 10 10 | 10 10 | 10 20 | 20 20 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

D2→ points to row 3

*FIG. 9C*

| 01 01 | 01 02 | 78 55 | 44 FF |
|---|---|---|---|
| FF FF | FF FF | FF 11 | 11 11 |
| 66 12 | 77 45 | 89 10 | 55 10 |
| 10 10 | 10 10 | 10 20 | 20 20 |
| 20 20 | 20 20 | 12 13 | 14 15 |
| 16 17 | 18 19 | 20 11 | 11 11 |
| 00 00 | 00 00 | 00 00 | 00 00 |
| 00 00 | 00 00 | 00 00 | 00 00 |

D3→ points to row 5

*FIG. 9D*

| 01 01 | 01 02 | 78 55 | 44 FF |
|---|---|---|---|
| FF FF | FF FF | FF 11 | 11 11 |
| 66 12 | 77 45 | 89 10 | 55 10 |
| 10 10 | 10 10 | 10 20 | 20 20 |
| 20 20 | 20 20 | 12 13 | 14 15 |
| 16 17 | 18 19 | 20 11 | 11 11 |
| 11 98 | B0 F2 | AB AB | AB AB |
| AB FF | FE FC | FD FF | FF FF |

D4→ points to row 7

SETTING CONDITION
VERTICAL LINE REARRANGEMENT PERFORMED
TOTAL NUMBER OF DEVELOPED BYTES: 64 BYTES (16×4)
NUMBER OF BYTES IN 1 LINE: 16 BYTES
NUMBER OF DEVELOPED LINES: 4 LINES

LOCAL MEMORY

| 01 01 | 00 00 | 00 00 | 00 00 | ... | 00 00 |
|---|---|---|---|---|---|
| 01 02 | 00 00 | 00 00 | 00 00 | ... | 00 00 |
| 78 55 | 00 00 | 00 00 | 00 00 | ... | 00 00 |
| 44 FF | 00 00 | 00 00 | 00 00 | ... | 00 00 |
| FF FF | 00 00 | 00 00 | 00 00 | ... | 00 00 |
| FF FF | 00 00 | 00 00 | 00 00 | ... | 00 00 |
| FF 11 | 00 00 | 00 00 | 00 00 | ... | 00 00 |
| 11 11 | 00 00 | 00 00 | 00 00 | ... | 00 00 |

| 01 01 | 66 12 | 00 00 | 00 00 | ... | 00 00 |
|---|---|---|---|---|---|
| 01 02 | 77 45 | 00 00 | 00 00 | ... | 00 00 |
| 78 55 | 89 10 | 00 00 | 00 00 | ... | 00 00 |
| 44 FF | 55 10 | 00 00 | 00 00 | ... | 00 00 |
| FF FF | 10 10 | 00 00 | 00 00 | ... | 00 00 |
| FF FF | 10 10 | 00 00 | 00 00 | ... | 00 00 |
| FF 11 | 10 20 | 00 00 | 00 00 | ... | 00 00 |
| 11 11 | 20 20 | 00 00 | 00 00 | ... | 00 00 |

| 01 01 | 66 12 | 20 20 | 00 00 | ... | 00 00 |
|---|---|---|---|---|---|
| 01 02 | 77 45 | 20 20 | 00 00 | ... | 00 00 |
| 78 55 | 89 10 | 12 13 | 00 00 | ... | 00 00 |
| 44 FF | 55 10 | 14 15 | 00 00 | ... | 00 00 |
| FF FF | 10 10 | 16 17 | 00 00 | ... | 00 00 |
| FF FF | 10 10 | 18 19 | 00 00 | ... | 00 00 |
| FF 11 | 10 20 | 20 11 | 00 00 | ... | 00 00 |
| 11 11 | 20 20 | 11 11 | 00 00 | ... | 00 00 |

| 01 01 | 66 12 | 20 20 | 11 98 | ... | 00 00 |
|---|---|---|---|---|---|
| 01 02 | 77 45 | 20 20 | B0 F2 | ... | 00 00 |
| 78 55 | 89 10 | 12 13 | AB AB | ... | 00 00 |
| 44 FF | 55 10 | 14 15 | AB AB | ... | 00 00 |
| FF FF | 10 10 | 16 17 | AB FF | ... | 00 00 |
| FF FF | 10 10 | 18 19 | FE FC | ... | 00 00 |
| FF 11 | 10 20 | 20 11 | FD FF | ... | 00 00 |
| 11 11 | 20 20 | 11 11 | FF FF | ... | 00 00 |

FIG. 14

SETTING CONDITION
VERTICAL LINE REARRANGEMENT PERFORMED
TOTAL NUMBER OF DEVELOPED BYTES: 60 BYTES (15 × 4)
NUMBER OF BYTES IN 1 LINE: 15 BYTES
NUMBER OF DEVELOPED LINES: 4 LINES

LOCAL MEMORY

| | | | | | |
|---|---|---|---|---|---|
| 01 01 | 00 00 | 00 00 | 00 00 | ⋯ | 00 00 |
| 01 02 | 00 00 | 00 00 | 00 00 | ⋯ | 00 00 |
| 78 55 | 00 00 | 00 00 | 00 00 | ⋯ | 00 00 |
| 44 FF | 00 00 | 00 00 | 00 00 | ⋯ | 00 00 |
| FF FF | 00 00 | 00 00 | 00 00 | ⋯ | 00 00 |
| FF FF | 00 00 | 00 00 | 00 00 | ⋯ | 00 00 |
| FF 11 | 00 00 | 00 00 | 00 00 | ⋯ | 00 00 |
| 11 00 | 00 00 | 00 00 | 00 00 | ⋯ | 00 00 |

| | | | | | |
|---|---|---|---|---|---|
| 01 01 | 66 12 | 00 00 | 00 00 | ⋯ | 00 00 |
| 01 02 | 77 45 | 00 00 | 00 00 | ⋯ | 00 00 |
| 78 55 | 89 10 | 00 00 | 00 00 | ⋯ | 00 00 |
| 44 FF | 55 10 | 00 00 | 00 00 | ⋯ | 00 00 |
| FF FF | 10 10 | 00 00 | 00 00 | ⋯ | 00 00 |
| FF FF | 10 10 | 00 00 | 00 00 | ⋯ | 00 00 |
| FF 11 | 10 20 | 00 00 | 00 00 | ⋯ | 00 00 |
| 11 00 | 20 00 | 00 00 | 00 00 | ⋯ | 00 00 |

| | | | | | |
|---|---|---|---|---|---|
| 01 01 | 66 12 | 20 20 | 00 00 | ⋯ | 00 00 |
| 01 02 | 77 45 | 20 20 | 00 00 | ⋯ | 00 00 |
| 78 55 | 89 10 | 12 13 | 00 00 | ⋯ | 00 00 |
| 44 FF | 55 10 | 14 15 | 00 00 | ⋯ | 00 00 |
| FF FF | 10 10 | 16 17 | 00 00 | ⋯ | 00 00 |
| FF FF | 10 10 | 18 19 | 00 00 | ⋯ | 00 00 |
| FF 11 | 10 20 | 20 11 | 00 00 | ⋯ | 00 00 |
| 11 00 | 20 00 | 11 00 | 00 00 | ⋯ | 00 00 |

| | | | | | |
|---|---|---|---|---|---|
| 01 01 | 66 12 | 20 20 | 11 98 | ⋯ | 00 00 |
| 01 02 | 77 45 | 20 20 | B0 F2 | ⋯ | 00 00 |
| 78 55 | 89 10 | 12 13 | AB AB | ⋯ | 00 00 |
| 44 FF | 55 10 | 14 15 | AB AB | ⋯ | 00 00 |
| FF FF | 10 10 | 16 17 | AB FF | ⋯ | 00 00 |
| FF FF | 10 10 | 18 19 | FE FC | ⋯ | 00 00 |
| FF 11 | 10 20 | 20 11 | FD FF | ⋯ | 00 00 |
| 11 00 | 20 00 | 11 00 | FF 00 | ⋯ | 00 00 |

SETTING CONDITION
NO VERTICAL LINE REARRANGEMENT
TOTAL NUMBER OF DEVELOPED BYTES: 60 BYTES (15×4)
NUMBER OF BYTES IN 1 LINE: 15 BYTES
NUMBER OF DEVELOPED LINES: 4 LINES

LOCAL MEMORY

*FIG. 16A*   D1→

| 01 | 01 | 01 | 02 | 78 | 55 | 44 | FF |
|----|----|----|----|----|----|----|----|
| FF | FF | FF | FF | FF | 11 | 11 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |

*FIG. 16B*

| 01 | 01 | 01 | 02 | 78 | 55 | 44 | FF |
|----|----|----|----|----|----|----|----|
| FF | FF | FF | FF | FF | 11 | 11 | 00 |
| 66 | 12 | 77 | 45 | 89 | 10 | 55 | 10 |
| 10 | 10 | 10 | 10 | 10 | 20 | 20 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |

D2→ points to row 3

*FIG. 16C*

| 01 | 01 | 01 | 02 | 78 | 55 | 44 | FF |
|----|----|----|----|----|----|----|----|
| FF | FF | FF | FF | FF | 11 | 11 | 00 |
| 66 | 12 | 77 | 45 | 89 | 10 | 55 | 10 |
| 10 | 10 | 10 | 10 | 10 | 20 | 20 | 00 |
| 20 | 20 | 20 | 20 | 12 | 13 | 14 | 15 |
| 16 | 17 | 18 | 19 | 20 | 11 | 11 | 00 |
| 00 | 00 | 00 | 00 | 00 | 00 | 00 | 00 |
| 00 | 00 | 00 | 00 | 00 | 00 | 00 | 00 |

D3→ points to row 5

*FIG. 16D*

| 01 | 01 | 01 | 02 | 78 | 55 | 44 | FF |
|----|----|----|----|----|----|----|----|
| FF | FF | FF | FF | FF | 11 | 11 | 00 |
| 66 | 12 | 77 | 45 | 89 | 10 | 55 | 10 |
| 10 | 10 | 10 | 10 | 10 | 20 | 20 | 00 |
| 20 | 20 | 20 | 20 | 12 | 13 | 14 | 15 |
| 16 | 17 | 18 | 19 | 20 | 11 | 11 | 00 |
| 11 | 98 | B0 | F2 | AB | AB | AB | AB |
| AB | FF | FE | FC | FD | FF | FF | 00 |

D4→ points to row 7

SETTING CONDITION
VERTICAL LINE REARRANGEMENT PERFORMED
TOTAL NUMBER OF DEVELOPED BYTES: 64 BYTES (16×4)
NUMBER OF BYTES IN 1 LINE: 16 BYTES
NUMBER OF DEVELOPED LINES: 4 LINES

LOCAL MEMORY

| 00 | 01 | 00 | 00 | 00 | 00 | 00 | 00 | ··· | 00 | 00 |
|----|----|----|----|----|----|----|----|-----|----|----|
| 01 | 01 | 00 | 00 | 00 | 00 | 00 | 00 | ··· | 00 | 00 |
| 02 | 78 | 00 | 00 | 00 | 00 | 00 | 00 | ··· | 00 | 00 |
| 55 | 44 | 00 | 00 | 00 | 00 | 00 | 00 | ··· | 00 | 00 |
| FF | FF | 00 | 00 | 00 | 00 | 00 | 00 | ··· | 00 | 00 |
| FF | FF | 00 | 00 | 00 | 00 | 00 | 00 | ··· | 00 | 00 |
| FF | FF | 00 | 00 | 00 | 00 | 00 | 00 | ··· | 00 | 00 |
| 11 | 11 | 00 | 00 | 00 | 00 | 00 | 00 | ··· | 00 | 00 |
| 11 | 00 | 00 | 00 | 00 | 00 | 00 | 00 | ··· | 00 | 00 |

| 00 | 01 | 00 | 66 | 00 | 00 | 00 | 00 | ··· | 00 | 00 |
|----|----|----|----|----|----|----|----|-----|----|----|
| 01 | 01 | 12 | 77 | 00 | 00 | 00 | 00 | ··· | 00 | 00 |
| 02 | 78 | 45 | 89 | 00 | 00 | 00 | 00 | ··· | 00 | 00 |
| 55 | 44 | 10 | 55 | 00 | 00 | 00 | 00 | ··· | 00 | 00 |
| FF | FF | 10 | 10 | 00 | 00 | 00 | 00 | ··· | 00 | 00 |
| FF | FF | 10 | 10 | 00 | 00 | 00 | 00 | ··· | 00 | 00 |
| FF | FF | 10 | 10 | 00 | 00 | 00 | 00 | ··· | 00 | 00 |
| 11 | 11 | 20 | 20 | 00 | 00 | 00 | 00 | ··· | 00 | 00 |
| 11 | 00 | 20 | 00 | 00 | 00 | 00 | 00 | ··· | 00 | 00 |

| 00 | 01 | 00 | 66 | 00 | 20 | 00 | 00 | ··· | 00 | 00 |
|----|----|----|----|----|----|----|----|-----|----|----|
| 01 | 01 | 12 | 77 | 20 | 20 | 00 | 00 | ··· | 00 | 00 |
| 02 | 78 | 45 | 89 | 20 | 12 | 00 | 00 | ··· | 00 | 00 |
| 55 | 44 | 10 | 55 | 13 | 14 | 00 | 00 | ··· | 00 | 00 |
| FF | FF | 10 | 10 | 15 | 16 | 00 | 00 | ··· | 00 | 00 |
| FF | FF | 10 | 10 | 17 | 18 | 00 | 00 | ··· | 00 | 00 |
| FF | FF | 10 | 10 | 19 | 20 | 00 | 00 | ··· | 00 | 00 |
| 11 | 11 | 20 | 20 | 11 | 11 | 00 | 00 | ··· | 00 | 00 |
| 11 | 00 | 20 | 00 | 11 | 00 | 00 | 00 | ··· | 00 | 00 |

| 00 | 01 | 00 | 66 | 00 | 20 | 00 | 11 | ··· | 00 | 00 |
|----|----|----|----|----|----|----|----|-----|----|----|
| 01 | 01 | 12 | 77 | 20 | 20 | 98 | B0 | ··· | 00 | 00 |
| 02 | 78 | 45 | 89 | 20 | 12 | F2 | AB | ··· | 00 | 00 |
| 55 | 44 | 10 | 55 | 13 | 14 | AB | AB | ··· | 00 | 00 |
| FF | FF | 10 | 10 | 15 | 16 | AB | AB | ··· | 00 | 00 |
| FF | FF | 10 | 10 | 17 | 18 | FF | FE | ··· | 00 | 00 |
| FF | FF | 10 | 10 | 19 | 20 | FC | FD | ··· | 00 | 00 |
| 11 | 11 | 20 | 20 | 11 | 11 | FF | FF | ··· | 00 | 00 |
| 11 | 00 | 20 | 00 | 11 | 00 | FF | 00 | ··· | 00 | 00 |

*FIG. 23*

SETTING CONDITION
VERTICAL LINE REARRANGEMENT PERFORMED
TOTAL NUMBER OF DEVELOPED BYTES: 60 BYTES (15×4)
NUMBER OF BYTES IN 1 LINE: 15 BYTES
NUMBER OF DEVELOPED LINES: 4 LINES

LOCAL MEMORY

| 00 | 01 | 00 | 00 | 00 | 00 | 00 | 00 | ... | 00 | 00 |
|----|----|----|----|----|----|----|----|-----|----|----|
| 01 | 01 | 00 | 00 | 00 | 00 | 00 | 00 | ... | 00 | 00 |
| 02 | 78 | 00 | 00 | 00 | 00 | 00 | 00 | ... | 00 | 00 |
| 55 | 44 | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| 11 | 11 | 00 | 00 | 00 | 00 | 00 | 00 | ... | 00 | 00 |

| 00 | 01 | 00 | 66 | 00 | 00 | 00 | 00 | ... | 00 | 00 |
|----|----|----|----|----|----|----|----|-----|----|----|
| 01 | 01 | 12 | 77 | 00 | 00 | 00 | 00 | ... | 00 | 00 |
| 02 | 78 | 45 | 89 | 00 | 00 | 00 | 00 | ... | 00 | 00 |
| 55 | 44 | 10 | 55 | 00 | 00 | 00 | 00 | ... | 00 | 00 |
| FF | FF | 10 | 10 | 00 | 00 | 00 | 00 | ... | 00 | 00 |
| FF | FF | 10 | 10 | 00 | 00 | 00 | 00 | ... | 00 | 00 |
| FF | FF | 10 | 10 | 00 | 00 | 00 | 00 | ... | 00 | 00 |
| 11 | 11 | 20 | 20 | 00 | 00 | 00 | 00 | ... | 00 | 00 |

| 00 | 01 | 00 | 66 | 00 | 20 | 00 | 00 | ... | 00 | 00 |
|----|----|----|----|----|----|----|----|-----|----|----|
| 01 | 01 | 12 | 77 | 20 | 20 | 00 | 00 | ... | 00 | 00 |
| 02 | 78 | 45 | 89 | 20 | 12 | 00 | 00 | ... | 00 | 00 |
| 55 | 44 | 10 | 55 | 13 | 14 | 00 | 00 | ... | 00 | 00 |
| FF | FF | 10 | 10 | 15 | 16 | 00 | 00 | ... | 00 | 00 |
| FF | FF | 10 | 10 | 17 | 18 | 00 | 00 | ... | 00 | 00 |
| FF | FF | 10 | 10 | 19 | 20 | 00 | 00 | ... | 00 | 00 |
| 11 | 11 | 20 | 20 | 11 | 11 | 00 | 00 | ... | 00 | 00 |

| 00 | 01 | 00 | 66 | 00 | 20 | 00 | 11 | ... | 00 | 00 |
|----|----|----|----|----|----|----|----|-----|----|----|
| 01 | 01 | 12 | 77 | 20 | 20 | 98 | B0 | ... | 00 | 00 |
| 02 | 78 | 45 | 89 | 20 | 12 | F2 | AB | ... | 00 | 00 |
| 55 | 44 | 10 | 55 | 13 | 14 | AB | AB | ... | 00 | 00 |
| FF | FF | 10 | 10 | 15 | 16 | AB | AB | ... | 00 | 00 |
| FF | FF | 10 | 10 | 17 | 18 | FF | FE | ... | 00 | 00 |
| FF | FF | 10 | 10 | 19 | 20 | FC | FD | ... | 00 | 00 |
| 11 | 11 | 20 | 20 | 11 | 11 | FF | FF | ... | 00 | 00 |

SETTING CONDITION
VERTICAL LINE REARRANGEMENT PERFORMED
TOTAL NUMBER OF DEVELOPED BYTES: 64 BYTES (16 × 4)
NUMBER OF BYTES IN 1 LINE: 16 BYTES
NUMBER OF DEVELOPED LINES: 4 LINES

LOCAL MEMORY

FIG. 29A

D1↓  IMAGE 1

| 01 01 | 00 00 | 00 00 | 00 00 | ⋯ | 00 00 |
|---|---|---|---|---|---|
| 01 02 | 00 00 | 00 00 | 00 00 | ⋯ | 00 00 |
| 78 55 | 00 00 | 00 00 | 00 00 | ⋯ | 00 00 |
| 44 FF | 00 00 | 00 00 | 00 00 | ⋯ | 00 00 |
| FF FF | 00 00 | 00 00 | 00 00 | ⋯ | 00 00 |
| FF FF | 00 00 | 00 00 | 00 00 | ⋯ | 00 00 |
| FF 11 | 00 00 | 00 00 | 00 00 | ⋯ | 00 00 |
| 11 11 | 00 00 | 00 00 | 00 00 | ⋯ | 00 00 |

FIG. 29B

D2↓  IMAGE 2

| 66 12 | 00 00 | 00 00 | 00 00 | ⋯ | 00 00 |
|---|---|---|---|---|---|
| 77 45 | 00 00 | 00 00 | 00 00 | ⋯ | 00 00 |
| 89 10 | 00 00 | 00 00 | 00 00 | ⋯ | 00 00 |
| 55 10 | 00 00 | 00 00 | 00 00 | ⋯ | 00 00 |
| 10 10 | 00 00 | 00 00 | 00 00 | ⋯ | 00 00 |
| 10 10 | 00 00 | 00 00 | 00 00 | ⋯ | 00 00 |
| 10 20 | 00 00 | 00 00 | 00 00 | ⋯ | 00 00 |
| 20 20 | 00 00 | 00 00 | 00 00 | ⋯ | 00 00 |

FIG. 29C

D3↓  IMAGE 1

| 01 01 | 20 20 | 00 00 | 00 00 | ⋯ | 00 00 |
|---|---|---|---|---|---|
| 01 02 | 20 20 | 00 00 | 00 00 | ⋯ | 00 00 |
| 78 55 | 12 13 | 00 00 | 00 00 | ⋯ | 00 00 |
| 44 FF | 14 15 | 00 00 | 00 00 | ⋯ | 00 00 |
| FF FF | 16 17 | 00 00 | 00 00 | ⋯ | 00 00 |
| FF FF | 18 19 | 00 00 | 00 00 | ⋯ | 00 00 |
| FF 11 | 20 11 | 00 00 | 00 00 | ⋯ | 00 00 |
| 11 11 | 11 11 | 00 00 | 00 00 | ⋯ | 00 00 |

FIG. 29D

D4↓  IMAGE 2

| 66 12 | 11 98 | 00 00 | 00 00 | ⋯ | 00 00 |
|---|---|---|---|---|---|
| 77 45 | B0 F2 | 00 00 | 00 00 | ⋯ | 00 00 |
| 89 10 | AB AB | 00 00 | 00 00 | ⋯ | 00 00 |
| 55 10 | AB AB | 00 00 | 00 00 | ⋯ | 00 00 |
| 10 10 | AB FF | 00 00 | 00 00 | ⋯ | 00 00 |
| 10 10 | FE FC | 00 00 | 00 00 | ⋯ | 00 00 |
| 10 20 | FD FF | 00 00 | 00 00 | ⋯ | 00 00 |
| 20 20 | FF FF | 00 00 | 00 00 | ⋯ | 00 00 |

SETTING CONDITION
NO VERTICAL LINE REARRANGEMENT
TOTAL NUMBER OF DEVELOPED BYTES: 64 BYTES (16 × 4)
NUMBER OF BYTES IN 1 LINE: 16 BYTES
NUMBER OF DEVELOPED LINES: 4 LINES

LOCAL MEMORY

FIG. 30A

IMAGE 1

D1 →

| 01 01 | 01 02 | 78 55 | 44 FF |
|---|---|---|---|
| FF FF | FF FF | FF 11 | 11 11 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

FIG. 30B

IMAGE 2

D2 →

| 66 12 | 77 45 | 89 10 | 55 10 |
|---|---|---|---|
| 10 10 | 10 10 | 10 20 | 20 20 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

FIG. 30C

IMAGE 1

| 01 01 | 01 02 | 78 55 | 44 FF |
|---|---|---|---|
| FF FF | FF FF | FF 11 | 11 11 |
| 20 20 | 20 20 | 12 13 | 14 15 |
| 16 17 | 18 19 | 20 11 | 11 11 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

D3 → (points to row "20 20 ...")

FIG. 30D

IMAGE 2

| 66 12 | 77 45 | 89 10 | 55 10 |
|---|---|---|---|
| 10 10 | 10 10 | 10 20 | 20 20 |
| 11 98 | B0 F2 | AB AB | AB AB |
| AB FF | FE FC | FD FF | FF FF |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

D4 → (points to row "11 98 ...")

SETTING CONDITION
VERTICAL LINE REARRANGEMENT PERFORMED
TOTAL NUMBER OF DEVELOPED BYTES: 60 BYTES (15×4)
NUMBER OF BYTES IN 1 LINES: 15 BYTES
NUMBER OF DEVELOPED LINES: 4 LINES

LOCAL MEMORY

FIG. 31A

D1↓  IMAGE 1

| 01 01 | 00 00 | 00 00 | 00 00 | ⋯ | 00 00 |
| 01 02 | 00 00 | 00 00 | 00 00 | ⋯ | 00 00 |
| 78 55 | 00 00 | 00 00 | 00 00 | ⋯ | 00 00 |
| 44 FF | 00 00 | 00 00 | 00 00 | ⋯ | 00 00 |
| FF FF | 00 00 | 00 00 | 00 00 | ⋯ | 00 00 |
| FF FF | 00 00 | 00 00 | 00 00 | ⋯ | 00 00 |
| FF 11 | 00 00 | 00 00 | 00 00 | ⋯ | 00 00 |
| 11 00 | 00 00 | 00 00 | 00 00 | ⋯ | 00 00 |

FIG. 31B

D2↓  IMAGE 2

| 66 12 | 00 00 | 00 00 | 00 00 | ⋯ | 00 00 |
| 77 45 | 00 00 | 00 00 | 00 00 | ⋯ | 00 00 |
| 89 10 | 00 00 | 00 00 | 00 00 | ⋯ | 00 00 |
| 55 10 | 00 00 | 00 00 | 00 00 | ⋯ | 00 00 |
| 10 10 | 00 00 | 00 00 | 00 00 | ⋯ | 00 00 |
| 10 10 | 00 00 | 00 00 | 00 00 | ⋯ | 00 00 |
| 10 20 | 00 00 | 00 00 | 00 00 | ⋯ | 00 00 |
| 20 00 | 00 00 | 00 00 | 00 00 | ⋯ | 00 00 |

FIG. 31C

D3↓  IMAGE 1

| 01 01 | 20 20 | 00 00 | 00 00 | ⋯ | 00 00 |
| 01 02 | 20 20 | 00 00 | 00 00 | ⋯ | 00 00 |
| 78 55 | 12 13 | 00 00 | 00 00 | ⋯ | 00 00 |
| 44 FF | 14 15 | 00 00 | 00 00 | ⋯ | 00 00 |
| FF FF | 16 17 | 00 00 | 00 00 | ⋯ | 00 00 |
| FF FF | 18 19 | 00 00 | 00 00 | ⋯ | 00 00 |
| FF 11 | 20 11 | 00 00 | 00 00 | ⋯ | 00 00 |
| 11 00 | 11 00 | 00 00 | 00 00 | ⋯ | 00 00 |

FIG. 31D

D4↓  IMAGE 2

| 66 12 | 11 98 | 00 00 | 00 00 | ⋯ | 00 00 |
| 77 45 | B0 F2 | 00 00 | 00 00 | ⋯ | 00 00 |
| 89 10 | AB AB | 00 00 | 00 00 | ⋯ | 00 00 |
| 55 10 | AB AB | 00 00 | 00 00 | ⋯ | 00 00 |
| 10 10 | AB FF | 00 00 | 00 00 | ⋯ | 00 00 |
| 10 10 | FE FC | 00 00 | 00 00 | ⋯ | 00 00 |
| 10 20 | FD FF | 00 00 | 00 00 | ⋯ | 00 00 |
| 20 00 | FF 00 | 00 00 | 00 00 | ⋯ | 00 00 |

SETTING CONDITION
NO VERTICAL LINE REARRANGEMENT
TOTAL NUMBER OF DEVELOPED BYTES: 60 BYTES (15 × 4)
NUMBER OF BYTES IN 1 LINE: 15 BYTES
NUMBER OF DEVELOPED LINES: 4 LINES

LOCAL MEMORY

*FIG. 32A*

IMAGE 1

D1 →

| 01 | 01 | 01 | 02 | 78 | 55 | 44 | FF |
|----|----|----|----|----|----|----|----|
| FF | FF | FF | FF | FF | 11 | 11 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |

*FIG. 32B*

IMAGE 2

D2 →

| 66 | 12 | 77 | 45 | 89 | 10 | 55 | 10 |
|----|----|----|----|----|----|----|----|
| 10 | 10 | 10 | 10 | 10 | 20 | 20 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |

*FIG. 32C*

IMAGE 1

| 01 | 01 | 01 | 02 | 78 | 55 | 44 | FF |
|----|----|----|----|----|----|----|----|
| FF | FF | FF | FF | FF | 11 | 11 | 00 |
| 20 | 20 | 20 | 20 | 12 | 13 | 14 | 15 |
| 16 | 17 | 18 | 19 | 20 | 11 | 11 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |

D3 → (third row)

*FIG. 32D*

IMAGE 2

| 66 | 12 | 77 | 45 | 89 | 10 | 55 | 10 |
|----|----|----|----|----|----|----|----|
| 10 | 10 | 10 | 10 | 10 | 20 | 20 | 00 |
| 11 | 98 | B0 | F2 | AB | AB | AB | AB |
| AB | FF | FE | FC | FD | FF | FF | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |
| 00 | 00 | 00 | 00 | 00 | 00 | 00 | 00 |

D4 → (third row)

SETTING CONDITION
VERTICAL LINE REARRANGEMENT PERFORMED
TOTAL NUMBER OF DEVELOPED BYTES: 64 BYTES (16 × 4)
NUMBER OF BYTES IN 1 LINE: 16 BYTES
NUMBER OF DEVELOPED LINES: 4 LINES

LOCAL MEMORY

FIG. 33A

D1 ↓  IMAGE 1

| 00 | 01 | 00 | 00 | 00 | 00 | 00 | 00 | ... | 00 | 00 |
|----|----|----|----|----|----|----|----|-----|----|----|
| 01 | 01 | 00 | 00 | 00 | 00 | 00 | 00 | ... | 00 | 00 |
| 02 | 78 | 00 | 00 | 00 | 00 | 00 | 00 | ... | 00 | 00 |
| 55 | 44 | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| 11 | 11 | 00 | 00 | 00 | 00 | 00 | 00 | ... | 00 | 00 |
| 11 | 00 | 00 | 00 | 00 | 00 | 00 | 00 | ... | 00 | 00 |

FIG. 33B

D2 ↓  IMAGE 2

| 00 | 66 | 00 | 00 | 00 | 00 | 00 | 00 | ... | 00 | 00 |
|----|----|----|----|----|----|----|----|-----|----|----|
| 12 | 77 | 00 | 00 | 00 | 00 | 00 | 00 | ... | 00 | 00 |
| 45 | 89 | 00 | 00 | 00 | 00 | 00 | 00 | ... | 00 | 00 |
| 10 | 55 | 00 | 00 | 00 | 00 | 00 | 00 | ... | 00 | 00 |
| 10 | 10 | 00 | 00 | 00 | 00 | 00 | 00 | ... | 00 | 00 |
| 10 | 10 | 00 | 00 | 00 | 00 | 00 | 00 | ... | 00 | 00 |
| 10 | 10 | 00 | 00 | 00 | 00 | 00 | 00 | ... | 00 | 00 |
| 20 | 20 | 00 | 00 | 00 | 00 | 00 | 00 | ... | 00 | 00 |
| 20 | 00 | 00 | 00 | 00 | 00 | 00 | 00 | ... | 00 | 00 |

FIG. 33C

D3 ↓  IMAGE 1

| 00 | 01 | 00 | 20 | 00 | 00 | 00 | 00 | ... | 00 | 00 |
|----|----|----|----|----|----|----|----|-----|----|----|
| 01 | 01 | 20 | 20 | 00 | 00 | 00 | 00 | ... | 00 | 00 |
| 02 | 78 | 20 | 12 | 00 | 00 | 00 | 00 | ... | 00 | 00 |
| 55 | 44 | 13 | 14 | 00 | 00 | 00 | 00 | ... | 00 | 00 |
| FF | FF | 15 | 16 | 00 | 00 | 00 | 00 | ... | 00 | 00 |
| FF | FF | 17 | 18 | 00 | 00 | 00 | 00 | ... | 00 | 00 |
| FF | FF | 19 | 20 | 00 | 00 | 00 | 00 | ... | 00 | 00 |
| 11 | 11 | 11 | 11 | 00 | 00 | 00 | 00 | ... | 00 | 00 |
| 11 | 00 | 11 | 00 | 00 | 00 | 00 | 00 | ... | 00 | 00 |

FIG. 33D

D4 ↓  IMAGE 2

| 00 | 66 | 00 | 11 | 00 | 00 | 00 | 00 | ... | 00 | 00 |
|----|----|----|----|----|----|----|----|-----|----|----|
| 12 | 77 | 98 | B0 | 00 | 00 | 00 | 00 | ... | 00 | 00 |
| 45 | 89 | F2 | AB | 00 | 00 | 00 | 00 | ... | 00 | 00 |
| 10 | 55 | AB | AB | 00 | 00 | 00 | 00 | ... | 00 | 00 |
| 10 | 10 | AB | AB | 00 | 00 | 00 | 00 | ... | 00 | 00 |
| 10 | 10 | FF | FE | 00 | 00 | 00 | 00 | ... | 00 | 00 |
| 10 | 10 | FC | FD | 00 | 00 | 00 | 00 | ... | 00 | 00 |
| 20 | 20 | FF | FF | 00 | 00 | 00 | 00 | ... | 00 | 00 |
| 20 | 00 | FF | 00 | 00 | 00 | 00 | 00 | ... | 00 | 00 |

SETTING CONDITION
VERTICAL LINE REARRANGEMENT PERFORMED
TOTAL NUMBER OF DEVELOPED BYTES: 60 BYTES (15 × 4)
NUMBER OF BYTES IN 1 LINE: 15 BYTES
NUMBER OF DEVELOPED LINES: 4 LINES

LOCAL MEMORY

*FIG. 34A*  D1↓  IMAGE 1

| 00 | 01 | 00 00 | 00 00 | 00 00 | ... | 00 00 |
|----|----|-------|-------|-------|-----|-------|
| 01 | 01 | 00 00 | 00 00 | 00 00 | ... | 00 00 |
| 02 | 78 | 00 00 | 00 00 | 00 00 | ... | 00 00 |
| 55 | 44 | 00 00 | 00 00 | 00 00 | ... | 00 00 |
| FF | FF | 00 00 | 00 00 | 00 00 | ... | 00 00 |
| FF | FF | 00 00 | 00 00 | 00 00 | ... | 00 00 |
| FF | FF | 00 00 | 00 00 | 00 00 | ... | 00 00 |
| 11 | 11 | 00 00 | 00 00 | 00 00 | ... | 00 00 |

*FIG. 34B*  D2↓  IMAGE 2

| 00 | 66 | 00 00 | 00 00 | 00 00 | ... | 00 00 |
|----|----|-------|-------|-------|-----|-------|
| 12 | 77 | 00 00 | 00 00 | 00 00 | ... | 00 00 |
| 45 | 89 | 00 00 | 00 00 | 00 00 | ... | 00 00 |
| 10 | 55 | 00 00 | 00 00 | 00 00 | ... | 00 00 |
| 10 | 10 | 00 00 | 00 00 | 00 00 | ... | 00 00 |
| 10 | 10 | 00 00 | 00 00 | 00 00 | ... | 00 00 |
| 10 | 10 | 00 00 | 00 00 | 00 00 | ... | 00 00 |
| 20 | 20 | 00 00 | 00 00 | 00 00 | ... | 00 00 |

*FIG. 34C*  D3↓  IMAGE 1

| 00 | 01 | 00 | 20 | 00 00 | 00 00 | ... | 00 00 |
|----|----|----|----|-------|-------|-----|-------|
| 01 | 01 | 20 | 20 | 00 00 | 00 00 | ... | 00 00 |
| 02 | 78 | 20 | 12 | 00 00 | 00 00 | ... | 00 00 |
| 55 | 44 | 13 | 14 | 00 00 | 00 00 | ... | 00 00 |
| FF | FF | 15 | 16 | 00 00 | 00 00 | ... | 00 00 |
| FF | FF | 17 | 18 | 00 00 | 00 00 | ... | 00 00 |
| FF | FF | 19 | 20 | 00 00 | 00 00 | ... | 00 00 |
| 11 | 11 | 11 | 11 | 00 00 | 00 00 | ... | 00 00 |

*FIG. 34D*  D4↓  IMAGE 2

| 00 | 66 | 00 | 11 | 00 00 | 00 00 | ... | 00 00 |
|----|----|----|----|-------|-------|-----|-------|
| 12 | 77 | 98 | B0 | 00 00 | 00 00 | ... | 00 00 |
| 45 | 89 | F2 | AB | 00 00 | 00 00 | ... | 00 00 |
| 10 | 55 | AB | AB | 00 00 | 00 00 | ... | 00 00 |
| 10 | 10 | AB | AB | 00 00 | 00 00 | ... | 00 00 |
| 10 | 10 | FF | FE | 00 00 | 00 00 | ... | 00 00 |
| 10 | 10 | FC | FD | 00 00 | 00 00 | ... | 00 00 |
| 20 | 20 | FF | FF | 00 00 | 00 00 | ... | 00 00 |

SYSTEM AND METHOD FOR DMA DATA TRANSFERRING APPARATUS AND LIQUID EJECTION APPARATUS

The present application claims priority from a Japanese Patent Applications Nos. 2002-245324 filed on Aug. 26, 2002 and 2003-175095 filed on Jun. 19, 2003, the contents of which are incorporated herein by reference.

BACKGROUND OF THE INVENTION

1. Field of the Invention

The present invention relates to a data transferring apparatus of liquid ejection data and a liquid ejection apparatus having a data transferring apparatus of liquid ejection data for transferring the liquid ejection data to a liquid ejection head, wherein the liquid ejection data is inputted into the liquid ejection apparatus which ejects liquid such as ink droplets from the liquid ejection head onto a medium to be liquid-ejected.

2. Related Art

An inkjet type recording apparatus or printer serving as a liquid ejection apparatus records image data by ejecting ink from a recording head onto a recording sheet or the like. The inkjet type printer ejects ink droplets of plural colors from plural nozzle arrays of which is provided on a head face of the recording head as developing image data, which has been compressed to be capable of being developed in line, to bitmap images in line and forming the developed bitmap images on the recording side of the recording papers. It forms images on the recording papers by ejecting ink droplets of plural colors to form plural dots of ink. Further, the compressed data capable of being developed in line is, for example, the compressed data by the run length compression method which is generally widely known or the compressed data by the compression method capable of developing in consecutive order by bytes.

This inkjet type recording apparatus generally includes a data transferring apparatus for receiving image data compressed to be capable of being developed in line inputted from an external apparatus such as a personal computer, developing (extracting) the inputted compressed data in line, performing data processes required for the developed bitmap images and then transferring the data to a register of the recording head. The generally conventional data transferring apparatus is configured, for example, as shown in FIG. 36.

The data transferring apparatus 10 has a system bus SB as a data transfer route. To the system bus SB a microprocessor (MPU) 11, a RAM 12 and a head controlling unit 13 are coupled so as to transfer data, and a recording head 62 is coupled to the head controlling unit 13. The compressed recording data transferred from an information processing apparatus such as a personal computer or a digital camera which is not shown in drawings is stores in the RAM 12 via the system bus SB.

The compressed recording data stored in a compressed data storing area of the RAM 12 is transferred to the micro processor 11 via the system bus SB one byte each in order (a route represented by symbol A), extracted by a program in accordance with an extraction sequence one byte each in order, then transferred to the RAM 12 via the system bus SB one byte each in order once more (a route represented by the symbol B) and then stored a desired bitmap image area of the RAM 12. When the developed data has been completely stored in the bitmap image area of the RAM 12, the developed data in the bitmap image area of the RAM 12 is transferred to the register (not shown in drawings) in the head controlling unit 13 via the system bus SB one byte each (a route represented by the symbol C) and ink is ejected from each of the nozzle arrays of the recording head 62 onto the recording papers based on these bitmap images.

And, as an example of the prior art to speed up the data transfer process, it is well-known that two independent buses, a system bus and a local bus, are provided and two bus controllers are provided between the system bus and the local bus. In regard to the data transferring apparatus, parallel processing is performed, that is, one bus controller accesses a main memory which is coupled to the system bus while the other bus controller accesses the local memory which is coupled to the local bus so that the data transfer process speeds up as shown, for example, in Japanese Patent No. 3251053.

To enhance the performance speed of liquid ejection with regard to the data transferring apparatus 10 of the conventional liquid ejection apparatus configured as shown in FIG. 36, in other words, to further increase the recording speed in regard to the inkjet type recording apparatus, there are some obstacles as mentioned below.

First, since the compressed recording data is developed (extracted) by a program one byte each, it is impossible to process a great quantity of compressed data at high speed. If the micro processor 11 which operates at high speed clock and has a high process capacity is used speeding up can be achieved, however, that causes such a problem as the cost of the data transferring apparatus 10 gets extremely high if this expensive micro processor 11 is mounted.

In addition, since both the data transfer to the RAM 12 and the data transfer from the RAM 12 are performed through the micro processor 11, while the micro processor 11 executes other data processes or calculations such as the micro processor 11 fetches programs from the RAM 12, the data transfer might get into a waiting state, and thus the data transfer delay occurs, so that the data transfer at high speed cannot be achieved.

Further, since the same route is used for both the access route from the micro processor 11 to the RAM 12 via the system bus SB and the data transfer route from the RAM 12 to the recording head 62, the system bus SB is occupied while the microprocessor 11 accesses the RAM 12, so that the data transfer from the RAM 12 to the recording head 62 cannot be performed during that time. For this reason, the data transfer delay to the recording head 62 occurs, and thereby the data transfer rate cannot speed up.

Moreover, in regard to the teaching of Japanese Patent No. 3251053 described above, the compressed recording data is still developed (extracted) by a program one byte each, so that a great amount of compressed data cannot be developed at high speed. Therefore, in regard to the liquid ejection apparatus such as the recording apparatus which executes recording by developing the compressed recording data transferred from an information processing apparatus and then transferring it to the recording head, the speed of ejecting liquid cannot be enhanced because the process to develop the compressed data is still slow though the data transfer process can be performed at high speed.

The present invention has been achieved in view of the situation above, and the solution is to realize the development process of compressed data at high speed and the data transfer to the liquid ejection head at high speed and to considerably increase the liquid ejecting speed of the liquid ejection apparatus compared with that of the prior art.

SUMMARY OF THE INVENTION

Therefore, it is an object of the present invention to provide a data transferring apparatus of liquid ejection data and a liquid ejection apparatus, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a data transferring apparatus of liquid ejection data, includes two independent buses which are a system bus and a local bus, a main memory coupled to the system bus, capable of transferring data, a local memory coupled to the local bus, capable of transferring data and a decode unit comprising a decode circuit coupled between the system bus and the local bus, capable of transferring data mutually and developing liquid ejection data compressed to be developed in line based on hardware.

First, the compressed liquid ejection data developed by a conventional program based on software is developed by the decode circuit based on hardware. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed.

In addition, by the configuration to have two independent buses of the system bus and the local bus and the local memory which is coupled to the local bus, it is possible to secure the data transfer route of the liquid ejection data from an independent memory to the liquid ejection head while it is separated from an access route from a microprocessor to a memory. Therefore, it is possible to perform the data transfer from the local memory to a register of the liquid ejection head through the local bus not synchronized with the system bus. Owing to this, it is prevented that the data transfer from the memory to the liquid ejection head gets interrupted by the access from the microprocessor to the memory so that the recording performance speed gets low because the data transfer delay of liquid ejection data occurs.

In this way, according to the data transferring apparatus of liquid ejection data relating to the first aspect of the present invention, by two independent buses, namely, the system bus and the local bus and the decode unit incorporating the decode circuit developing the compressed data, it is possible to realize the development process of the compressed data at high speed and the data transfer to the liquid ejection head at high speed so that it is possible to increase the liquid ejecting speed of the liquid ejection apparatus considerably compared with that of the prior art.

According to the second aspect of the present invention, a data transferring apparatus of liquid ejection data, includes two independent buses which are a system bus and a local bus, a local memory coupled to the local bus, capable of transferring data and a decode unit comprising a decode circuit coupled between the system bus and the local bus, capable of transferring data mutually and developing liquid ejection data compressed to be developed in line based on hardware, a line buffer for storing liquid ejection data developed by the decode circuit per word unit and a DMA-transferring means for DMA-transferring liquid ejection data compressed to be developed in line from the main memory to the decode circuit, DMA-transferring liquid ejection data developed in the line buffer to the local memory per word unit and DMA-transferring developed liquid ejection data stored in the local memory to a register of an liquid ejection head sequentially.

First, the compressed liquid ejection data developed by a conventional program based on software is developed by the decode circuit based on hardware. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed.

In addition, the line buffer is provided to store data after development per word unit, and the compressed data, which used to be developed by the conventional program per one byte, is developed per word unit (2 bytes), stored in the line buffer and transferred to the local memory per word unit. That is, the amount of compressed data, which is developed and transferred at a time, gets twice that of the conventional way, and thus it is possible to perform the development process of compressed data at higher speed.

Further, by the configuration to have two independent buses of the system bus and the local bus and the local memory which is coupled to the local bus, it is possible to secure the data transfer route of the liquid ejection data from an independent memory to the liquid ejection head while it is separated from an access route from a microprocessor to a memory. Therefore, it is possible to perform the data transfer from the local memory to a register of the liquid ejection head through the local bus not synchronized with the system bus. Owing to this, it is prevented that the data transfer from the memory to the liquid ejection head gets interrupted by the access from the microprocessor to the memory so that the recording performance speed get slow because the data transfer delay of liquid ejection data occurs.

Further, the high-speed data transfer can be achieved by the DMA (Direct Memory Access) transfer. The DMA transfer is such a well-known transfer method as once addresses of a transfer source and a transfer destination or the number of transfer are set in a register, then the data transfer can be performed at high speed by hardware without the microprocessor.

In this way, according to the data transferring apparatus of liquid ejection data relating to the second aspect of the present invention, by two independent buses, namely, the system bus and the local bus, the decode unit incorporating the decode circuit and the DMA transferring means whereby the data transfer can be performed at high speed by hardware without the microprocessor, it is possible to realize the development process of the compressed data at high speed and the data transfer to the liquid ejection head at high speed so that it is possible to increase the liquid ejecting speed of the liquid ejection apparatus considerably compared with that of the prior art.

According to the third aspect of the present invention, with respect to the second aspect described above, registers of the main memory, the decode unit and the liquid ejection head may be incorporated in an ASIC as a circuit block, and registers of the decode unit and the liquid ejection head may be coupled through an exclusive bus in the ASIC.

In this way, since the main memory, which stores the compressed data, is configured to be the same block as the decode unit in the ASIC, high DMA transfer can be achieved so as to transfer data particularly with one clock. Therefore, the compressed liquid ejection data can be transferred to the decode unit at higher speed. In addition, since the registers of the liquid ejection head are also incorporated in the same ASIC as a circuit block, and coupled to the decode unit through an exclusive bus in the ASIC, the data transfer of developed liquid ejection data from the local memory to the liquid ejection head can be performed at higher speed.

In this way, according to the data transferring apparatus of liquid ejection data relating to the third aspect of the present invention, the compressed liquid ejection data can be transferred to the decode unit at higher speed, the data transfer of developed liquid ejection data from the local memory to the liquid ejection head can be performed at higher speed, and thus it is possible to further increase the liquid ejecting speed of the liquid ejection apparatus.

According to the fourth aspect of the present invention, with respect to the second or third aspect described above, the line buffer may comprise two sides of buffer areas capable of storing developed data of predetermined words, liquid ejection data developed by the decode circuit is sequentially stored in one of the sides and liquid ejection data developed by the decode circuit is sequentially stored in the other of the sides when developed data of predetermined words has been accumulated, while developed data of predetermined words is DMA-transferred to the local memory for each predetermined words when developed data of predetermined words has been accumulated.

In this way, the line buffer has two sides of buffer areas which are capable of storing the developed data of predetermined bytes, and stores the data which has been developed by the decode circuit in one of those sides, and when predetermined bytes have been accumulated, the developed data of one side is transferred per word unit by the DMA transferring means, while the data developed by the decoded circuit can be stored in the other side, so that it is possible to perform development process of compressed recording data and data transfer process in parallel.

In this way, according to the data transferring apparatus of liquid ejection data relating to the fourth aspect of the present invention, development process of compressed recording data and data transfer process can be perform in parallel, and thus it is possible to further increase the liquid ejecting speed of the liquid ejection apparatus.

According to the fifth aspect of the present invention, in regard to any of the second to fourth aspects described above, data transfers with respect to the local bus from the decode circuit to the local memory and from the local memory to a register of the liquid ejection head may be performed in a burst transfer.

The burst transfer is such a data transfer method which is a well-known method for speeding up the data transfer as, when the continuous data is transferred, the data is transferred while a bus is occupied until all data of a predetermined data block is completely transferred by omitting a part of a sequence such as an address designation so as to increase the data transfer speed. And, since the data transfer to the liquid ejection head performed via the system bus in the conventional method is per formed via the local bus separated from the system bus, the data transfers from the decode unit to the local memory via the local bus and from the local memory to the register of the liquid ejection head can be performed in the burst transfer.

In this way, according to the data transferring apparatus of liquid ejection data relating to the fifth aspect of the present invention, the data transfers to the liquid ejection head via the local bus can be performed in the burst transfer, and thus it is possible to further increase the liquid ejecting speed of the liquid ejection apparatus.

In addition, since the system bus and the local are independent each other, and the data transfer to the register of the liquid ejection head not synchronized with the system bus can be perform by the decode circuit of the decode unit and the line buffer, it is possible to maximize the effect of increasing the liquid ejecting speed of the liquid ejection apparatus.

According to the sixth aspect of the present invention, in regard to any of the second to fifth aspects described above, the compressed liquid ejection data may be run length compressed data, and the decode circuit may be capable of developing run length compressed data based on hardware.

Consequently, by the decode circuit whereby the run length compressed data capable of being developed in line can be developed based on hardware, the effect described in any of the first to fifth aspects can be achieved.

According to the sixth aspect of the present invention, in regard to any of the second to sixth aspects described above, the decode unit may be comprise a means for storing uncompressed liquid ejection data DMA-transferred from the main memory without developing by the decode circuit based on hardware.

Consequently, if the liquid ejection data stored in the main memory is uncompressed data, a means stores it the line buffer as it is without developing by the decode circuit based on hardware, and thus it is possible to further increase the liquid ejecting speed of the liquid ejection apparatus in regard to the uncompressed liquid ejection data.

According to the eighth aspect of the present invention, a liquid ejection apparatus comprises the data transferring apparatus of liquid ejection data in regard to any of the first to seven aspects described above.

Consequently, the effect described in any of the first to seventh aspects can be achieved in regard to the liquid ejection apparatus.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIGS. 9A to 9D are diagrams showing the recording data after development.

FIGS. 10A to 10D are diagrams showing the recording data after development.

FIG. 14 is a diagram showing such flow as compressed recording data is developed.

FIGS. 15A to 15D are diagrams showing the recording data after development.

FIGS. 16A to 16D are diagrams showing the recording data after development.

FIGS. 21A to 21D are diagrams showing the recording data after development.

FIG. 23 is a diagram showing such flow as compressed recording data is developed.

FIGS. 24A to 24D are diagrams showing the recording data after development.

FIGS. 29A to 29D are diagrams showing the recording data after development.

FIGS. 30A to 30D are diagrams showing the recording data after development.

FIGS. 31A to 31D are diagrams showing the recording data after development.

FIGS. 32A to 32D are diagrams showing the recording data after development.

FIGS. 33A to 33D are diagrams showing the recording data after development.

FIGS. 34A to 34D are diagrams showing the recording data after development.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
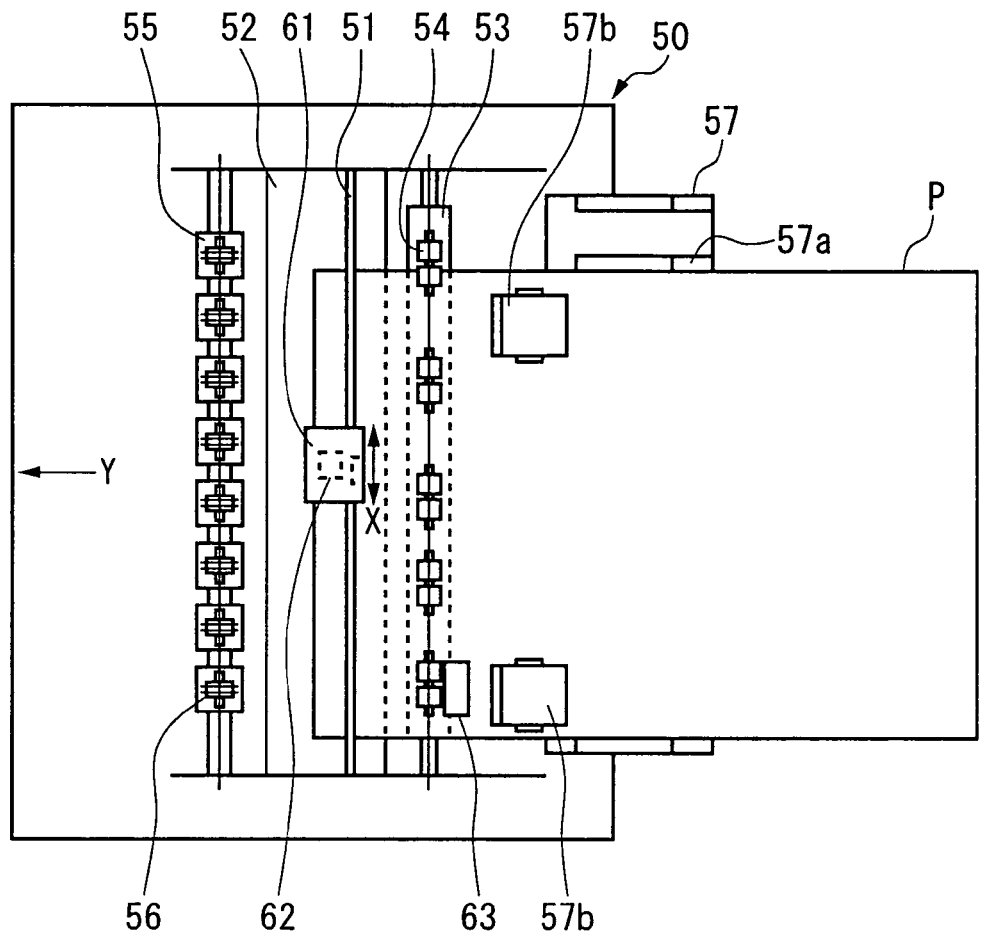
FIG. 1 is a plan view of an inkjet type recording apparatus relating to the present invention.
Figure 2:
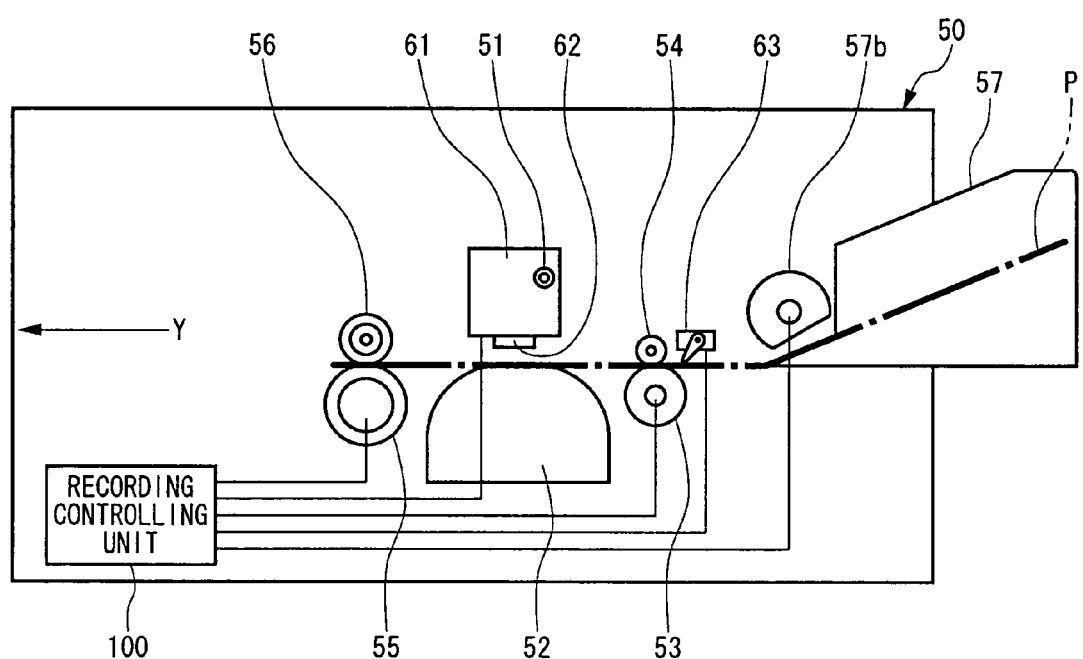
FIG. 2 is a side view of an inkjet type recording apparatus relating to the present invention.

To begin with, a first embodiment of the inkjet type recording apparatus or printer will be described as "liquid ejection apparatus" relating to the present invention. FIG. 1 is a schematic plan view of an inkjet type recording apparatus relating to the present invention, and FIG. 2 is a side view thereof.

In the inkjet type apparatus 50, a carriage 61 is provided to move along a main scanning direction X as a recording means which performs recording on recording papers P, rotatably supported by carriage guide shaft 51. On the carriage 61, a recording head 62 is mounted as a "liquid ejection head" which performs recording by ejecting ink onto the recording papers P. Opposite to the recording head 62, a platen 52 is provided to control a gap between the head surface of the recording head 62 and the recording papers P. A recording on the recording papers P is performed by repeating an operation of carrying the recording papers P between the carriage 61 and the platen 52 in a sub scanning direction Y a predetermined amount each and an operation of ejecting ink droplets onto the recording papers P from the recording head 62 while the recording head 62 moves back and forth once in the main scanning direction X.

A paper feeding tray 57 is configured to be capable of feeding the recording papers P such as normal papers or foot papers, and a ASF (auto sheet feeder) is provided in it as a paper feeding means to automatically feed the recording papers P. The ASF is an automatic paper feeding mechanism which has two paper feeding rollers 57b provided in the paper feeding tray 57 and a separating pad not shown in drawings. One of these two paper feeding rollers 57b is arranged at the one side of the paper feeding tray 57 while the other one of the paper feeding rollers 57b is installed at a recording paper guide 57a, and the recording paper guide 57a is provided at the paper feeding tray 57 to be capable of sliding in the longitudinal direction corresponding to the width of the recording papers P. And, by the rotation drive force of the paper feeding roller 57b and the frictional resistance of the separating pad, the plural recording papers P stacked in the paper feeding tray 57 are automatically and accurately fed not all but a piece each during feeding.

As a recording paper carrying means for carrying the recording papers P in the sub scanning direction Y, a driving transfer roller 53 and driven transfer rollers 54 are provided. The driving transfer roller 53 is rotatably controlled by the rotation drive force such as a stepping motor, and by the rotation of the driving transfer roller 53 the recording papers P are carried in the sub scanning direction Y. The driven transfer rollers 54 are provided as plural pieces, and each of them is urged by the driving transfer roller 53 to rotate in contact with the recording papers P as following the carriage of the recording papers P when the recording papers P are carried by the rotation of the driving transfer roller 53. On the surface of the driving transfer roller 53, a film which has high frictional resistance is provided. By the driven transfer rollers 54, the recording papers P pressed onto the surface of the driving transfer roller 53 are firmly in contact with the surface of the driving transfer roller 53 so that they are carried in the sub scanning direction Y by the rotation of the driving transfer roller 53.

And, a sheet sensor 63 is provided between the paper feeding roller 57b and the driving transfer roller 53 in the well-known art. The sheet sensor 63 has a lever to which a self-resetting characteristic into an upright position is granted pivotally supported to be rotatable only in the recording paper feeding direction as projecting toward the carriage route of the recording papers P, and is configured as the end of the lever is pushed toward the recording papers P and thus the lever is rotated so that the recording papers P are detected. The sheet sensor 63 detects the starting end position and the terminal end position of the recording papers P fed by the paper feeding roller 57b, and determines a recording area corresponding to the detected positions to perform recording.

Meanwhile, a paper discharge driving roller 55 and driven paper discharging rollers 56 are provided as a means for discharging the recording papers P which have been recorded. The paper discharge driving roller 55 is rotatably controlled by the rotation drive force such as a stepping motor, and by the rotation of the paper discharge driving roller 55 the recording papers P are carried in the sub scanning direction Y. The driven paper discharging rollers 56 have plural teeth on their circumference, and becomes a toothed roller in which the end of each tooth is sharp in an acute angle to be in contact with the recording surface of a recording paper P at point. Each of the plural driven paper discharging rollers 56 is urged by the paper discharge driving roller 55 to rotate in contact with the recording papers P as following the discharge of the recording papers P when the recording papers P are carried by the rotation of the paper discharge driving roller 55.

And, the rotation driving motor not shown in drawings which rotatably drives the paper feeding roller 57b or the driving transfer roller 53 and the paper discharge driving roller 55 and the carriage driving motor not shown in drawings which drives the carriage 61 in the main scanning direction are controlled by the recording controlling unit 100. In addition, the recording head is also controlled by the recording controlling unit 100 to ejecting ink droplets onto the surface of the recording papers P.

Figure 3:
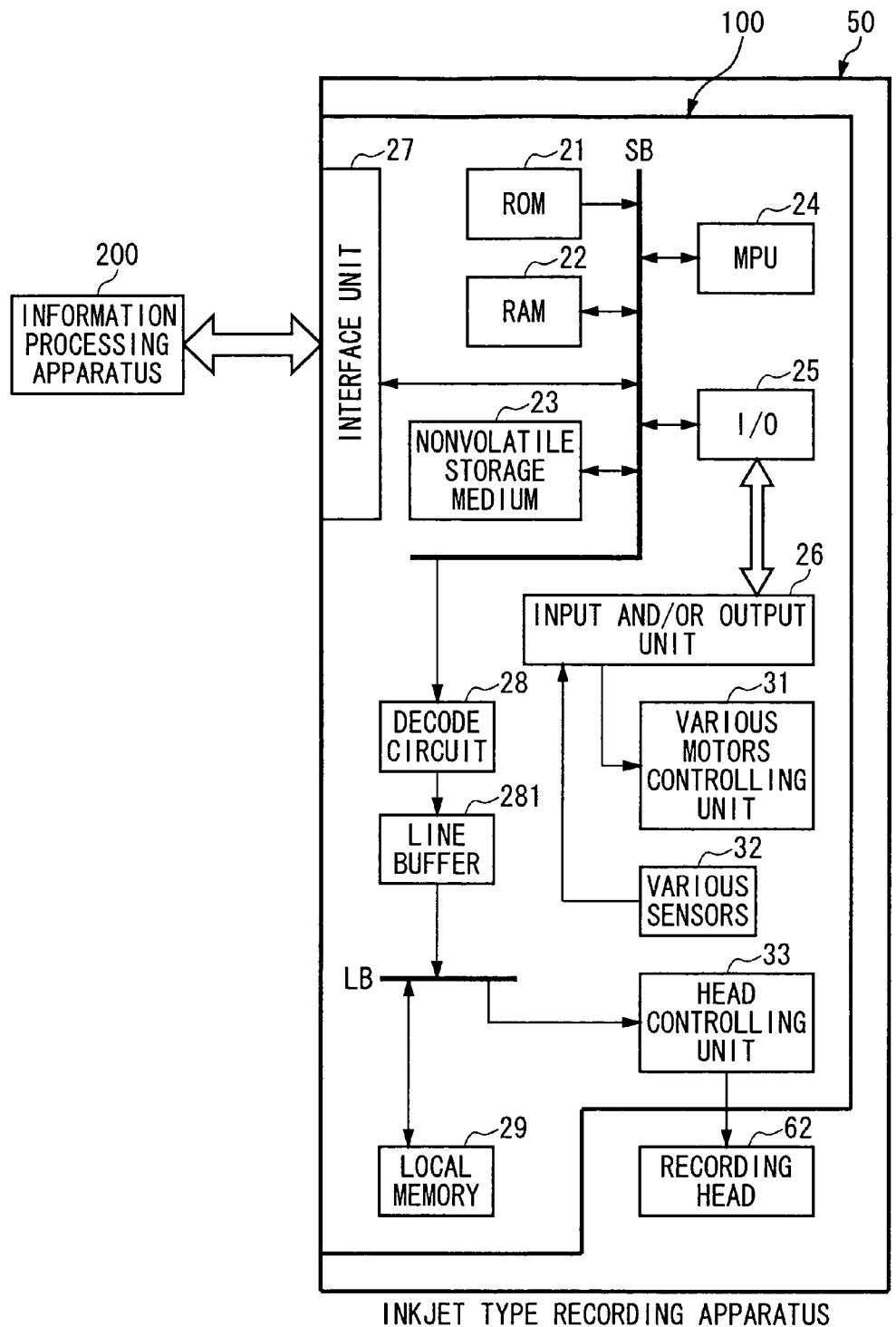
FIG. 3 is a flowchart of the inkjet type recording apparatus relating to the present invention.

FIG. 3 is a schematic flowchart of the inkjet type recording apparatus 50 relating to the present invention.

The inkjet type recording apparatus 50 has a recording controlling unit 100 for controlling various recording processes. The recording controlling unit 100 has two independent buses, namely, a system bus SB and a local bus LB. To the system bus SB a MPU (micro processor) 24, a ROM 21, a RAM 22, a nonvolatile storage medium 23, I/O 25 and a decode circuit 28 are coupled so as to be capable of transferring data. In the MPU 24 various calculation processes are performed. In the ROM 21, software/program and data needed for calculation processes of the MPU 24 are stored beforehand. The RAM 22 is used as a temporarily storing area for the software/program or a working area for the MPU 24. In the nonvolatile storage medium 23 such as a flash memory some data resulting from the calculation processes of the MPU 24 is stored, and it is designed to hold the data even if the power of the inkjet type recording apparatus 50 is turned off.

Further, the recording controlling unit 100 is configured to coupled to an information processing apparatus 200 such as a personal computer via an interface unit 27 which has an interface function with external apparatuses, and to be capable of processing input and output of various kinds of information or data via the system bus SB with the information processing apparatus 200. And, I/O 25 performs output control to a various motors controlling unit 31 via an input and/or output unit 26 based on the calculation process result of the MPU 24, and allows input information to be inputted from various sensors 32. The various motors controlling unit 31 is a drive control circuit which controls various motors of the inkjet type apparatus 50, and is controlled by the recording controlling unit 100. Further, the various sensors 32 detect various kinds of condition information of the inkjet type recording apparatus 50 and output them to the I/O 25 via the input and/or output unit 26.

During performing recording, the information processing apparatus 200 plays a host part to output recording data (liquid ejection data) compressed by the information processing apparatus 200, and the inkjet type apparatus 50 receives the compressed recording data from the interface unit 27 via the system bus SB. The decode circuit 28 develops the compressed recording data and then stores the developed recording data in a local memory 29 via the local bus LB. the developed recording data stored in the local memory 29 is transferred again from a register in a head controlling unit 33 to the recording head 62 via the local bus LB. The head controlling unit 33 controls the recording head 62 to eject ink droplets of various colors onto he recording papers P from the plural nozzle arrays provided on the head side of the recording head 62.

In this way, by two independent buses, namely, the system bus SB and the local bus LB and the decode circuit 28 developing the compressed data, it is possible to realize the development process of the compressed data at high speed and the data transfer to the recording head 62 at high speed so that it is possible to increase the liquid ejecting speed of the inkjet type recording apparatus 50 considerably compared with that of the conventional art. In the end, by not developing the compressed data by a program of single thread which performs various data processes in consecutive order besides the development process of the compressed data in regard to the MPU 24 in the conventional way but independently performing only the development of the compressed data by the decode circuit 28 which is exclusively used for developing compressed data, it is possible to perform the development process of the compressed recording data at high speed.

In addition, by the configuration to have two independent buses of the system bus SB and the local bus LB and the local memory 29 which is coupled to the local bus LB, it is possible to secure the data transfer route of recording data (local bus LB) to the recording head 62 which is separated from the system bus SB which is coupled to the MPU 24. Therefore, it is possible to perform the data transfer from the local memory 29 to the register of the recording head 62 through the local bus LB not synchronized with the system bus SB. Owing to this, it is prevented that the data transfer to the recording head 62 gets interrupted by the access from the MPU 24 to the RAM 22 so that the recording performance speed gets low because the data transfer delay of recording data occurs.

Further, in the present embodiment, a line buffer 281 is provided to store data after development per word unit between the decode circuit 28 and the local bus LB. The recording data developed in the decode circuit 28 is temporarily stored once in line buffer 281. The developed recording data stored in the line buffer 281 is transferred to the local memory 29 via the local bus LB two words each. In this way, the line buffer 281 may provided to store data after development per word unit between the decode circuit 28 and the local bus LB. By providing the line buffer 281 to store data after development per word unit, developing the compressed data, which used to be developed by the conventional program per one byte, per word unit (2 bytes), storing the data in the line buffer 281 and transferring the data to the local memory 29 per word unit, the amount of compressed data which is developed and transferred at a time gets twice that of the conventional way, and thus it is possible to perform the development process of compressed data at higher speed, which is desirable.

Figure 4:
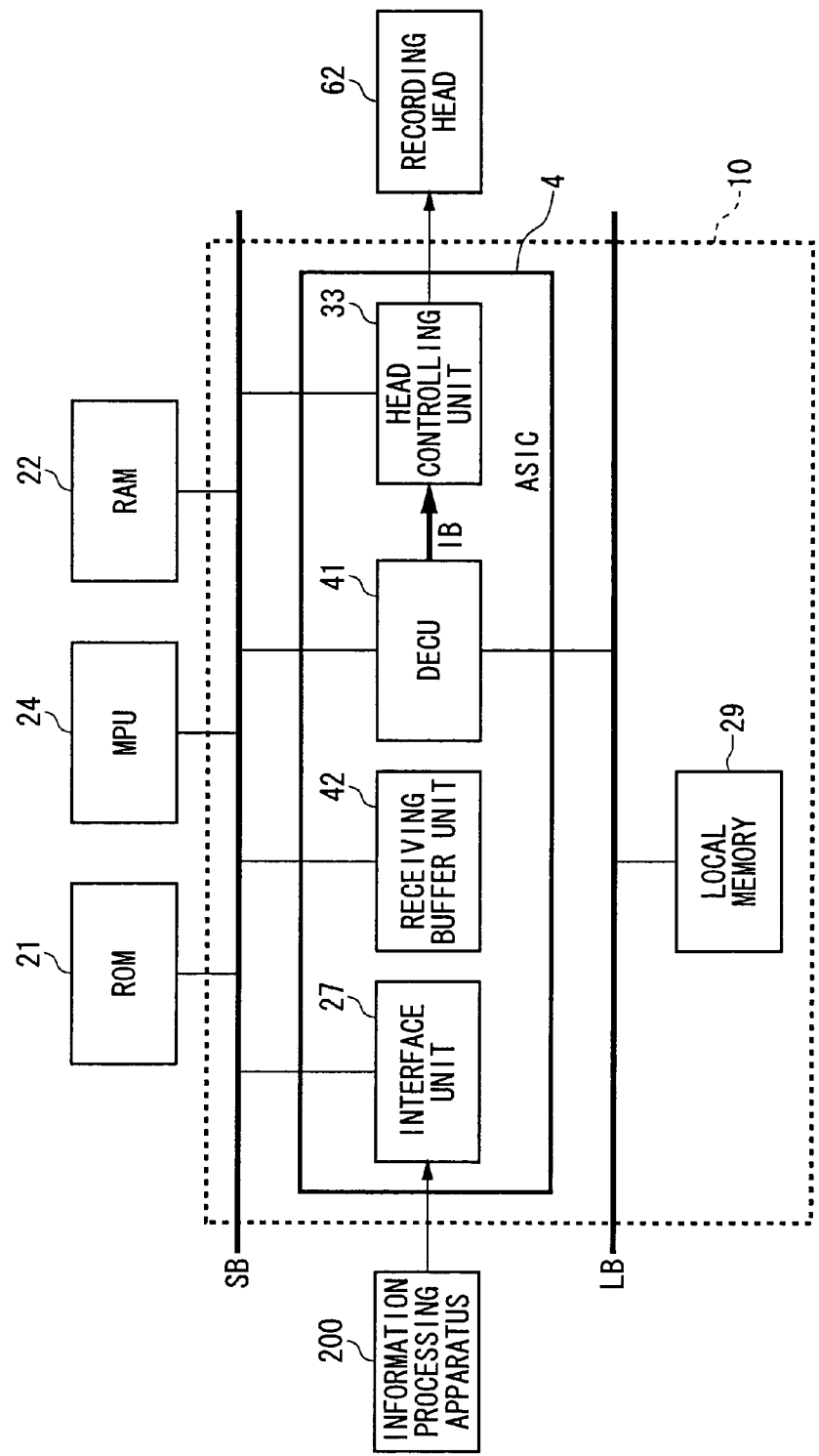
FIG. 4 is a block diagram showing the configuration of a data transferring apparatus relating to the present invention.
Figure 5:
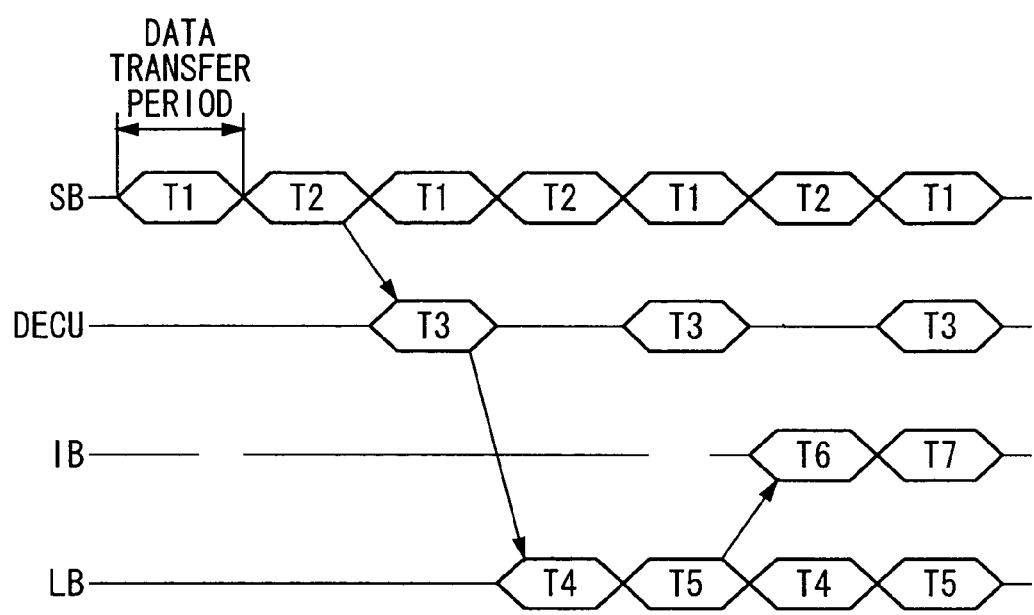
FIG. 5 is a timing chart showing the flow of recording data.

FIG. 4 is a block diagram showing the configuration of a data transferring apparatus 10 as a "data transferring apparatus of liquid ejection data" relating to the present invention. FIG. 5 is a timing chart schematically showing the flow of recording data in a data transferring apparatus 10.

The recording controlling unit 100 has a ASIC (Application Specific Integrated Circuit) 4, and the ASIC 4 incorporates the interface unit 27 described above, the head controlling unit 33 described above, a receiving buffer unit 42 and a DECU 41 as a "decode unit" relating to the present invention. The DECU 41 incorporates the decode circuit 28 described above, the line buffer 281 and a "DMA transferring means" (It will be described in detail.). The system bus SB and the local bus LB are 16 bits buses, and thus it is possible to transfer data of 1 word (2 bytes) per a predetermined data transfer period. Hereinafter, with reference to the timing chart shown in FIG. 5, the flow of recording data in regard to the data transferring apparatus 10 will be described.

The compressed recording data is DMA-transferred from the information processing apparatus 200 to the receiving buffer unit 42 as a "main memory" via the interface unit 27 through the system bus SB one word each (symbol T1). As described above, the DMA transfer is such a transfer method as once addresses of a transfer source and a transfer destination or the number of transfer are set in a register then the data transfer can be performed at high speed by hardware without the MPU 24. Next, data is DMA-transferred from the receiving buffer unit 42 to the DECU 41 via the system bus SB (symbol T2). Continuously, in the DECU 41, the compressed data of 1 word is developed by the decode circuit 28 based on hardware, and the developed recording data is stored in the line buffer 281 (symbol T3).

The recording data developed and stored in the line buffer 281 is DMA-transferred to a bit map area in the local memory 29 via the local bus LB with non-synchronization to the data transfer through the system SB when the recording data stored in the line buffer 281 has reached a predetermined amount (symbol T4). Continuously, the recording data as a bitmap data stored in the bitmap area of the local memory 29 is DMA-transferred again to the DECU 41 via the local bus LB (symbol T5), then DMA-transferred from the DECU 41 to the head controlling unit 33 via the an internal bus IB (symbol T6), then stored in a register in the head controlling unit 33 and then DMA-transferred to the recording head 62 (symbol T7).

In this way, the data transfer from the receiving buffer unit 42 (the main memory) to the decode circuit 28, the data transfer from the decode circuit 28 to the local memory 29 and the data transfer from the local memory 29 to the recording head 62 may be performed by the DMA transfer, and thus data transfer at higher speed can be achieved, which is more preferable. In addition, since the "main memory" which stores the compressed data is configured to be the same block as the DECU 41 in the ASIC 41 as the receiving buffer unit 42, high DMA transfer can be achieved so as to transfer data particularly with one clock. Moreover, a part of the RAM 22 may be used for the "main memory" without providing the receiving buffer unit 42 to the ASIC 41.

Figure 6:
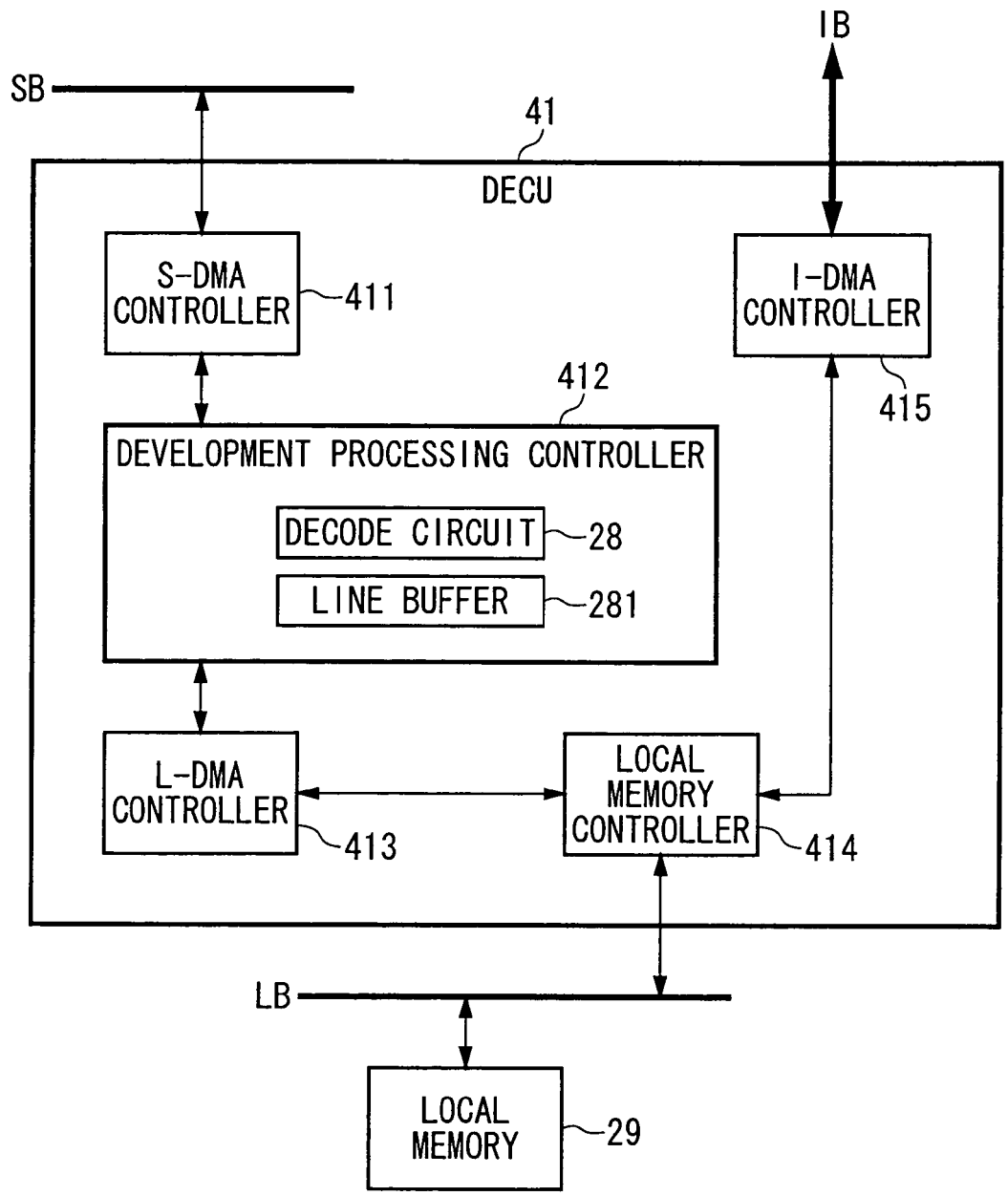
FIG. 6 is a block diagram showing the configuration of the DECU relating to the present invention.

FIG. 6 is a block diagram showing the configuration of the DECU 41 as the "decode unit" relating to the present invention.

A S-DMA controller 411 as the "DMA transferring means" described above is a controller for DMA transfer through the system bus SB. By the S-DMA controller 411, the compressed recording data stored in the receiving buffer unit 42 is DMA-transferred to the development processing controller 412 one word each. The development processing controller 412 incorporates the decode circuit 28 and the line buffer 281 described above. the compressed recording data DMA-transferred one word each by the S-DMA controller 411 from the receiving buffer unit 42 is developed by the decode circuit 28 one word each based on hardware, and the developed recording data is accumulated in the line buffer 281.

In the same way, a L-DMA controller 413 as the "DMA transferring means" is a controller for DMA transfer through the local bus LB. In addition, a local memory controller 414 retrieves from data the local memory 29 coupled to the local bus LB and controls writing in it. The recording data developed and DMA-transferred to the local memory 29 is stores in the predetermined bitmap area of the local memory 29.

In the same way, a I-DMA controller 415 is a controller for DMA transfer through the internal bus IB which is an exclusive bus between the DECU 41 in the ASIC and the head controlling unit 33. The developed recording data stored in the bitmap area of the local memory 29 is DMA-transferred to the head controlling unit 33 through the local bus LB and the internal bus IB via the local memory controller 414 by the I-DMA controller 415, then stored in a register in the had controlling unit 33 and then DMA-transferred to the recording head 62.

In addition, the DMA transfer from the line buffer 281 to the local memory 29 is transfer in burst by the L-DMA controller 413, and the DMA transfer from the local memory 29 to the recording head 62 is transfer in burst by the I-DMA controller 415. As described above, the burst transfer is such a data transfer method as, when the continuous data is transferred, the data is transferred occupying a bus until all data of a predetermined data block is completely transferred by omitting a part of a sequence such as an address designation. The L-DMA controller 413 transfers in burst the developed recording data of predetermined bytes one word each, occupying the local bus LB until the predetermined bytes have been DMA-transferred to the local memory 29, when the developed recording data of the predetermined bytes has been accumulated in the line buffer 281. The I-DMA controller 415 transfers in burst the developed recording data stored in the bitmap area of the local memory 29 one word per a data block of predetermined bytes, occupying the local bus LB until all of one data block has been completely DMA-transferred to the recording head 62.

In case the burst transfer from the line buffer 281 to the local memory 29 and the burst transfer from the local memory 29 to the recording head 62 compete each other, the burst transfer from the local memory 29 to the recording head 62 has priority, and thus during the burst transfer from the local memory 29 to the recording head 62 the burst transfer from the line buffer 281 to the local memory 29 is temporarily stopped, so that the ink ejecting operation from the nozzle arrays of the recording head 62 based on the recording data from the local memory 29 to the recording head 62 is not be interrupted.

In this way, by transferring data while occupying the local bus LB until all data of a predetermined data block is completely sent in regard to the recording head 62, such a problem as data transfer by the request of the MPU 24 through the system bus SB cannot be performed does not occur, and thus it is possible to perform data transfer of recording data to the recording head 62 at high speed.

Figure 7:
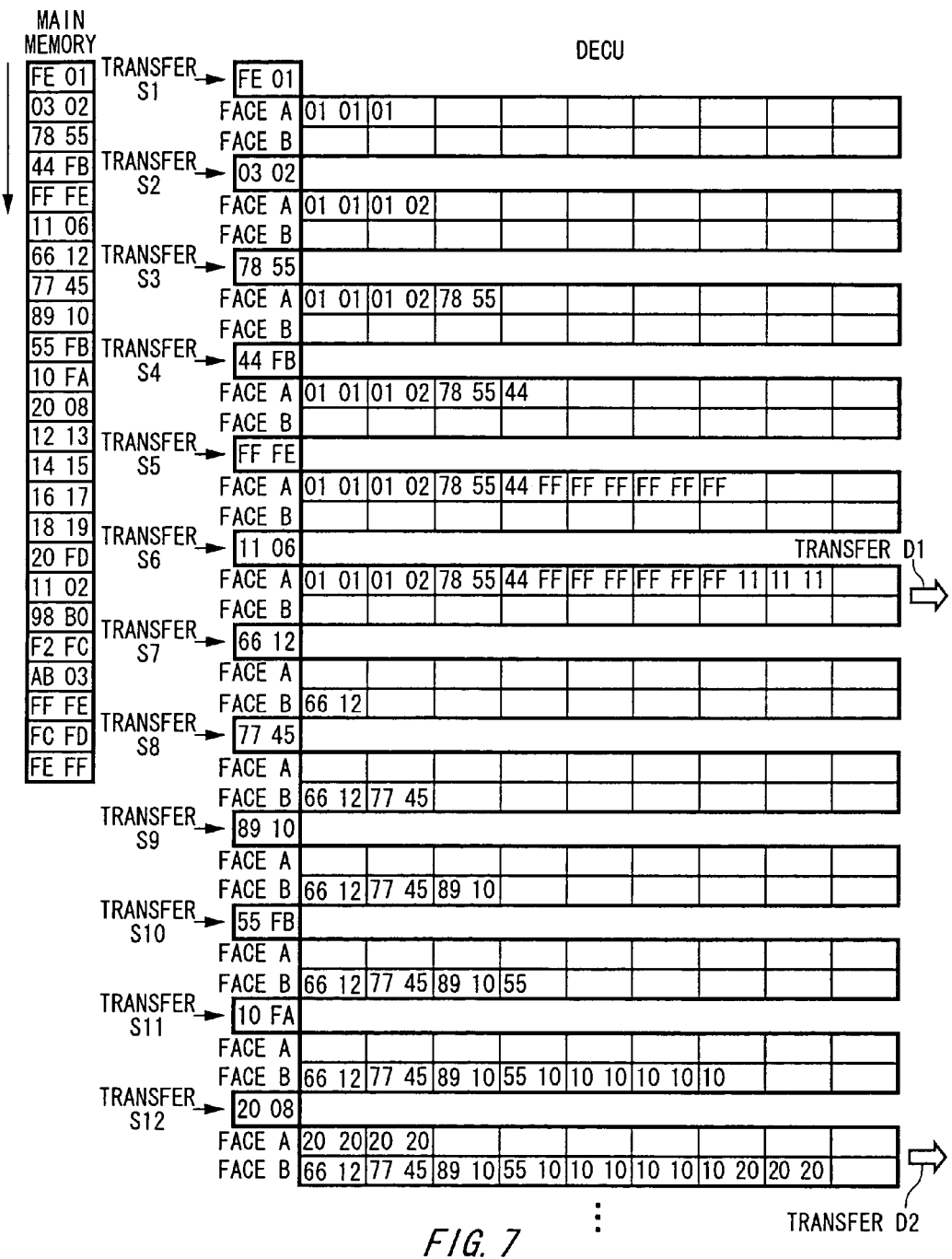
FIG. 7 is a diagram showing such flow as compressed recording data is developed.
Figure 8:
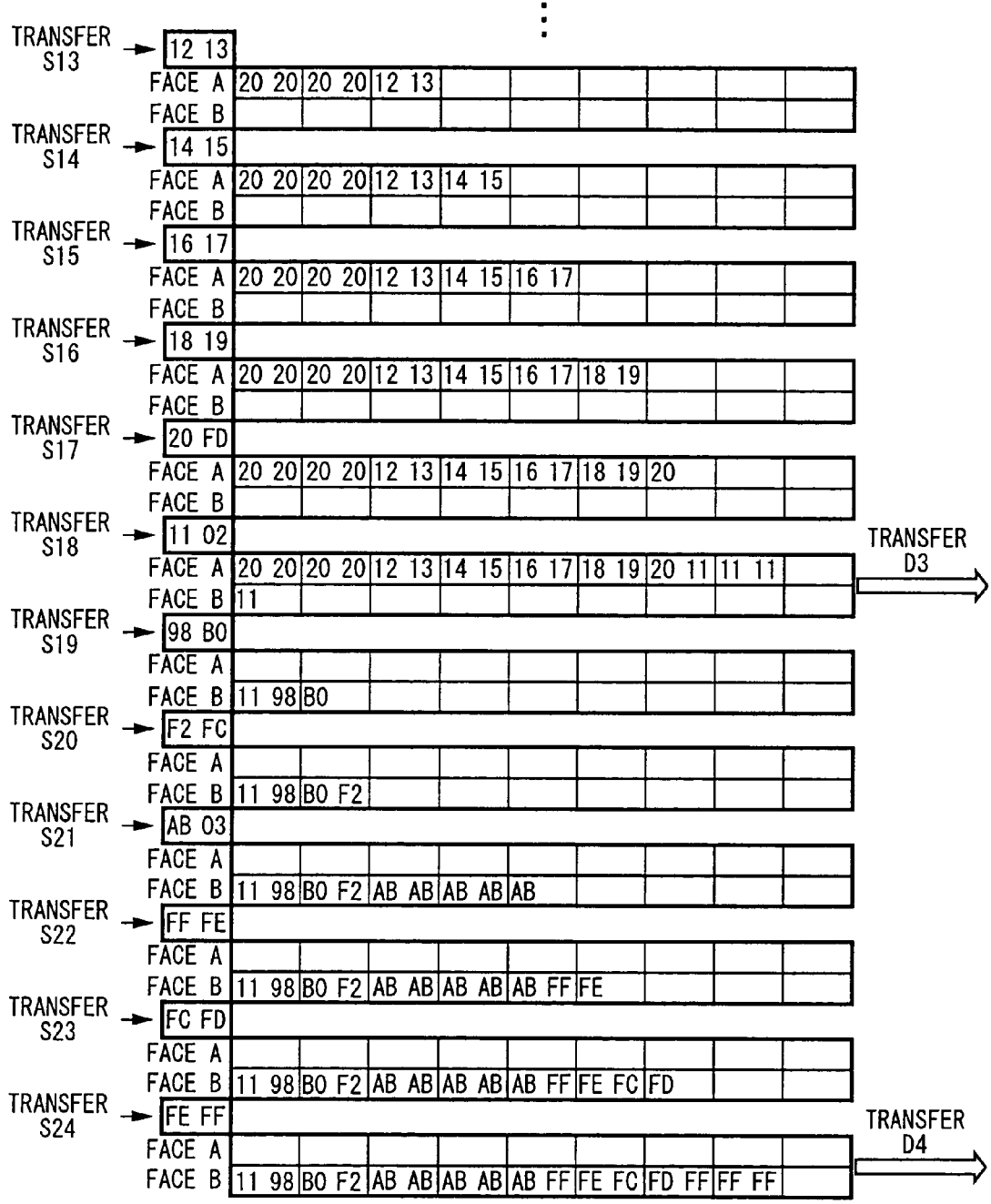
FIG. 8 is a diagram showing such flow as compressed recording data is developed.

FIG. 7 and FIG. 8 are diagrams schematically showing the state until compressed recording data is developed in the decoded circuit 28 based on hardware and stored in the line buffer 281 in the DECU 41. In addition, FIG. 9 is a diagram schematically showing the state until the developed recording data is transferred and stored from the line buffer 281 to the local memory 29.

In this embodiment, the compressed recording data has been compressed by a run length compression method. The run length compression method is a well-known data compression method and it will be briefly described below. The run length compressed data is compressed data of byte boundary, and has a set of count (1 byte) and data (1 byte or bytes). In other words, the run length compressed data is configured to first have the count and then necessarily have the data. If the value of the count is more than 128 (a negative constant), that is, more than 80H, that means repeatedly developing the next data of 1 byte, and thus the data of 1 byte following the count is repeatedly developed as many times as 257 from which the value of the count subtracted. On the other hand, if the value of the count is less than 127, that is, less than 7FH, that means continuing data to be developed as it is without repeating after the count, and thus the data following the count is developed as it is without repetition as many times as the value of the count to which one is added.

Next, the configuration of the line buffer 281 will be described. The line buffer 281 has two sides of data storing areas of 9 words which combine storing areas of 8 words (16 bytes) and preliminary storing areas of 1 word (2 bytes), and each of sides is A side and B side respectively. The recording data developed by the decode circuit 28 1 word each is stored in one of the A side and the B side of the line buffer 281 one word each in turn, and the data is turned to be stored into the other side when the developed data has been accumulated to be a predetermined amount, in the present embodiment 16 bytes. In addition, the accumulated and developed data of 16 bytes, as described above, is stored in a predetermined bitmap area of the local memory 29.

In this way, the line buffer 281 has two sides of buffer areas which are capable of storing the recording data after development of 16 bytes, and stores the recording data which has been developed by the decode circuit 28 in one of those sides. And, when 16 bytes have been accumulated, while the recording data after development of one side is transferred per word unit by a DMA transferring means, the recording data developed by the decoded circuit 28 can be stored in the other side, so that it is possible to perform development process of compressed recording data and data transfer process in parallel.

Continuously, run length compressed data taken for example, the flow of recording data will be described, wherein the compressed data is developed by the decode circuit 28, stored in the line buffer 281 and stored from the line buffer 281 to the local memory 29.

In the receiving buffer unit (main memory) 42, the run length compressed recording data of 24 words (48 bytes) which begins from FEH is stored. The run length compressed recording data is DMA-transferred to the decode circuit 28 via the system bus SB one word each, namely, two bytes each, developed based on hardware and stored in the line buffer 281. In the present embodiment, the data starting address of the run length compressed data is an even address, and the data starting address of the bit map data (image data) in the local memory 29 is an even address. And, the number of bytes of the data block DMA-transferred from the line buffer 281 to the local memory 29 (the number of bytes of 1 line) are 16 bytes.

Further, in the main memory, the line buffer 281 in the DECU 41 shown in FIG. 7 and the local memory 29 shown in FIG. 9, the left top is an even address, and addresses gets to be upper addresses in order from the left to the right, which will be the same with that of drawings below.

Hereinafter, one word each will be described in order. First, the compressed recording data of initial 1 word (FEH, 01H) DMA-transferred from the receiving buffer unit 42 to the decode circuit 28 in the DECU 41 (Transfer S1). The FEH is the count, and the 01H is the data. Since the value of the count of FEH is 254, that is, larger than 128 and 257−254=3 times, the data of 01H is repeatedly developed and 1 byte each is stored in order in the A side of the line buffer 281. Next, the run length compressed data DMA-transferred to the decode circuit 28 is 03H and 02H (Transfer S2). The 03H is the count, and the 02H is the data. Since the value of the count of 03H is 3, that is, smaller than 127 and 3+1=4 bytes, the data following the count gets developed without repletion. That is, the data of 02H, 78H, 55H and 44H following the count 03H is developed as it is without repetition, and stored in order in the A side of the line buffer 281 (Transfers S2 to S4). The FBH which is the upper part (odd address part) of the DMA-transferred word data in the Transfer S4 is the count, and the next data of 1 byte is repeatedly developed 6 times (257−251=6).

Continuously, the compressed recording data DMA-transferred to the decode circuit 28 is FFH and FEH (Transfer S5). The lower address (even address) of FFH is the data, besides the data of the previous count of FBH. Therefore, FFH is repeatedly developed 6 times, and stored in order in the A side of the line buffer 281. And, the upper address (odd address) of FEH is the count, and the next data of 1 byte is repeatedly developed 3 times (257−254=3). Continuously, the compressed recording data DMA-transferred to the decode circuit 28 is 11H and 06H (Transfer S6). The lower address (even address) of 11H is the data, besides the data of the previous count of FEH. Therefore, 11H is repeatedly developed 3 times, and stored in the A side of the line buffer 281. And, the upper address (odd address) of 06H is the count, and the next data (66H, 12H, 77H, 45H, 89H, 10H and 55H) of 7 bytes (6+1=7) is developed as it is without repetition, and stored in order in the B side of the line buffer 281 (Transfers S7 to S10).

In the meantime, when the developed recording data has been accumulated to be the number of bytes of 1 line in the A side of the line buffer 281, namely, 16 bytes (at the Transfer S6), the 16 bytes are DMA-transmitted to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D1). The recording data of 1 line transferred to the local memory 29 is stored 1 word each in order in the predetermined bitmap area of the local memory 29 at the first of the even address from the lower address (FIG. 9A).

Continuously, the compressed recording data DMA-transferred to the decode circuit 28 is 10H and FAH (Transfer S11). The lower address (even address) of 10H is the data, besides the data of the previous count of FBH. Therefore, 10H is repeatedly developed 6 times, and stored in order in the B side of the line buffer 281. And, the upper address (odd address) of FAH is the count, and the next data of 1 byte is repeatedly developed 7 times (257−250=7). Continuously, the compressed recording data DMA-transferred to the decode circuit 28 is 20H and 08H (Transfer S12). The lower address (even address) of 20H is the data, besides the data of the previous count of FAH. Therefore, 20H is repeatedly developed 7 times, and stored in the B side of the line buffer 281, and when the accumulated data in the B side has reached 16 bytes the remaining data gets stored in order in the A side. And, the upper address (odd address) of 08H is the count, and the next data (12H, 13H, 14H, 15H, 16H, 17H, 18H, 19H and 20H) of 9 bytes (8+1=9) is developed as it is without repetition, and stored in order in the A side of the line buffer 281 (Transfers S13 to S17 in FIG. 8).

In the mean time, when the developed recording data has been accumulated to be the number of bytes of 1 line in the B side of the line buffer 281, namely, 16 bytes (at the Transfer S12), the 16 bytes are DMA-transmitted to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D2). The recording data of 1 line transferred to the local memory 29 is stored 1 word each in order in the predetermined bitmap area of the local memory 29 at the first of the even address from the lower address (FIG. 9B).

Continuously, the compressed recording data DMA-transferred to the decode circuit 28 is 11H and 02H (Transfer S18). The lower address (even address) of 11H is the data, besides the data of the previous count of FDH. Therefore, 11H is repeatedly developed 3 times (257−254=3), and stored in the A side of the line buffer 281, and when the accumulated data in the A side has reached 16 bytes the remaining data gets stored in order in the B side. And, the upper address (odd address) of 02H is the count, and the next data (98H, B0H and F2H) of 3 bytes (2+1=3) is developed as it is without repetition, and stored in order in the B side of the line buffer 281 (Transfers S19 to S20).

In the mean time, when the developed recording data has been accumulated to be the number of bytes of 1 line in the A side of the line buffer 281, namely, 16 bytes (at the Transfer S18), the 16 bytes are DMA-transmitted to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D3). The recording data of 1 line transferred to the local memory 29 is stored 1 word each in order in the predetermined bitmap area of the local memory 29 at the first of the even address from the lower address (FIG. 9C).

Continuously, the compressed recording data DMA-transferred to the decode circuit 28 is ABH and 03H (Transfer S21). The lower address (even address) of ABH is the data, besides the data of the previous count of FCH (the upper address of the Transfer S20). Therefore, ABH is repeatedly developed 5 times (257−252=5), and stored in order in the B side of the line buffer 281. And, the upper address (odd address) of 03H is the count, and the next data (FFH, FEH, FCH and FDH) of 4 bytes (3+1=4) is developed as it is without repetition, and stored in order in the B side of the line buffer 281 (Transfers S22 to S23).

Continuously, the compressed recording data DMA-transferred to the decode circuit 28 is FEH and FFH (Transfer S24). The lower address (even address) of FEH is the data, besides the data of the count of FEH. Therefore, FFH is repeatedly developed 3 times (257−254=3), and stored in order in the B side of the line buffer 281. When the developed recording data has been accumulated to be the number of bytes of 1 line in the B side of the line buffer 281, namely, 16 bytes (at the Transfer S24), the 16 bytes are DMA-transmitted to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D4).

The recording data of 1 line transferred to the local memory 29 is stored 1 word each in order in the predetermined bitmap area of the local memory 29 at the first of the even address from the lower address (FIG. 9D). And, when the recording data of the bitmap data for ejecting ink with one main scanning pass has been stored in the local memory 29, data is DMA-transferred from the local memory 29 to the recording head 62. At this time, the I-DMA controller 415 (FIG. 6) transfers data in burst, occupying the local bus LB until all the recording data of the bitmap data for ejecting ink with one main scanning pass is completely DMA-transferred to the head controlling unit 33.

In this way, it is possible to perform the development process of the compressed recording data at high speed by developing the compressed recording data, which used to be developed by the conventional program based on software, in the decode circuit 28 based on hardware. In addition, since the compressed recording data, which used to be developed one byte each by the conventional program, is developed per word unit (two bytes), it is possible to perform the development process of the compressed recording data at high speed. And, by the configuration to have two independent buses, namely, the system bus SB and the local bus LB and the local memory 29 which is coupled to the local bus LB, it is possible to perform the data transfer to the from the local memory 29 to the recording head 62 through the local bus LB not synchronized with the system bus SB. Owing to this, it is prevented that the data transfer to the recording head 62 gets interrupted by the access from the MPU 24 to the RAM 22 so that the recording performance speed gets low because the data transfer delay of recording data occurs.

Accordingly, since it is possible to realize the development process of the compressed data at high speed and the data transfer to the recording head 62 at high speed, it is possible to increase the liquid ejecting speed of the inkjet type recording apparatus 50 considerably compared with that of the prior art. By the way, the data transfer speed to the recording head 62, which was 1 Mbytes/sec in the prior art, can be high up to 8 to 10 Mbytes/sec by the data transferring apparatus 10 relating to the present invention. Further, if the data processing capacity of the recording head 62 is low, no matter how fast the data transfer is performed, only the recording performance speed corresponding to the data processing capacity of the recording head 62 is obtained, and thus it is surely necessary to provide a recording head 62 which has enough process speed.

Next, as a second embodiment of the inkjet type recording apparatus 50 relating to the present invention, added to the first embodiment described above, when the developed recording data DMA-transferred from the DECU 41 to the local memory 29 is stored in the predetermined bitmap area, the data of 1 line is not stored in order from the lower address of the bitmap area (stored in a horizontal direction) but is changed and stored in a vertical direction to be well-arranged for the recording head 62.

FIG. 10 is a diagram schematically showing the state until the developed recording data is transferred and stored from the line buffer 281 to the local memory 29, and shows the state in which the data of 1 line is changed and stored in a vertical direction.

In the bitmap area of the local memory 29 which is the DMA transfer destination, the transfer destination address is individually set to each word of the developed recording data stored in the line buffer 281 by the development processing controller 412 (FIG. 6) in the DECU 41 in order that the data of 1 line is stored to be arranged in a vertical direction. And, the L-DMA controller 413 (FIG. 6) in the DECU 41 sets this individual transfer destination address as the transfer destination address of the DMA transfer, and DMA-transfers the developed recording data stored in the line buffer 281 to the local memory 29 one word each (data rearranging means).

In this way, when the recording data of 1 word (16 bytes) is DMA-transferred from the line buffer 281 to the local memory 29, it is possible to perform rearrangement of the necessary recording data instantly by performing rearrangement of the recording data developed in the DECU 41, comparing it with performing rearrangement of data in a memory 1 byte each in order by the conventional program, and thus it is possible to perform rearrangement of recording data at high speed.

Further, as a third embodiment of the inkjet type recording apparatus 50 relating to the present invention, added to the first or second embodiment described above, in case the data starting address of the run length compressed recording data stored in the receiving buffer unit 42 is an odd address, a invalid data mask processing means for nullifying the initial data of 1 byte of word data including the initial data of the run length compressed data DMA-transferred from the receiving buffer unit 42 to the decode circuit 28.

Figure 11:
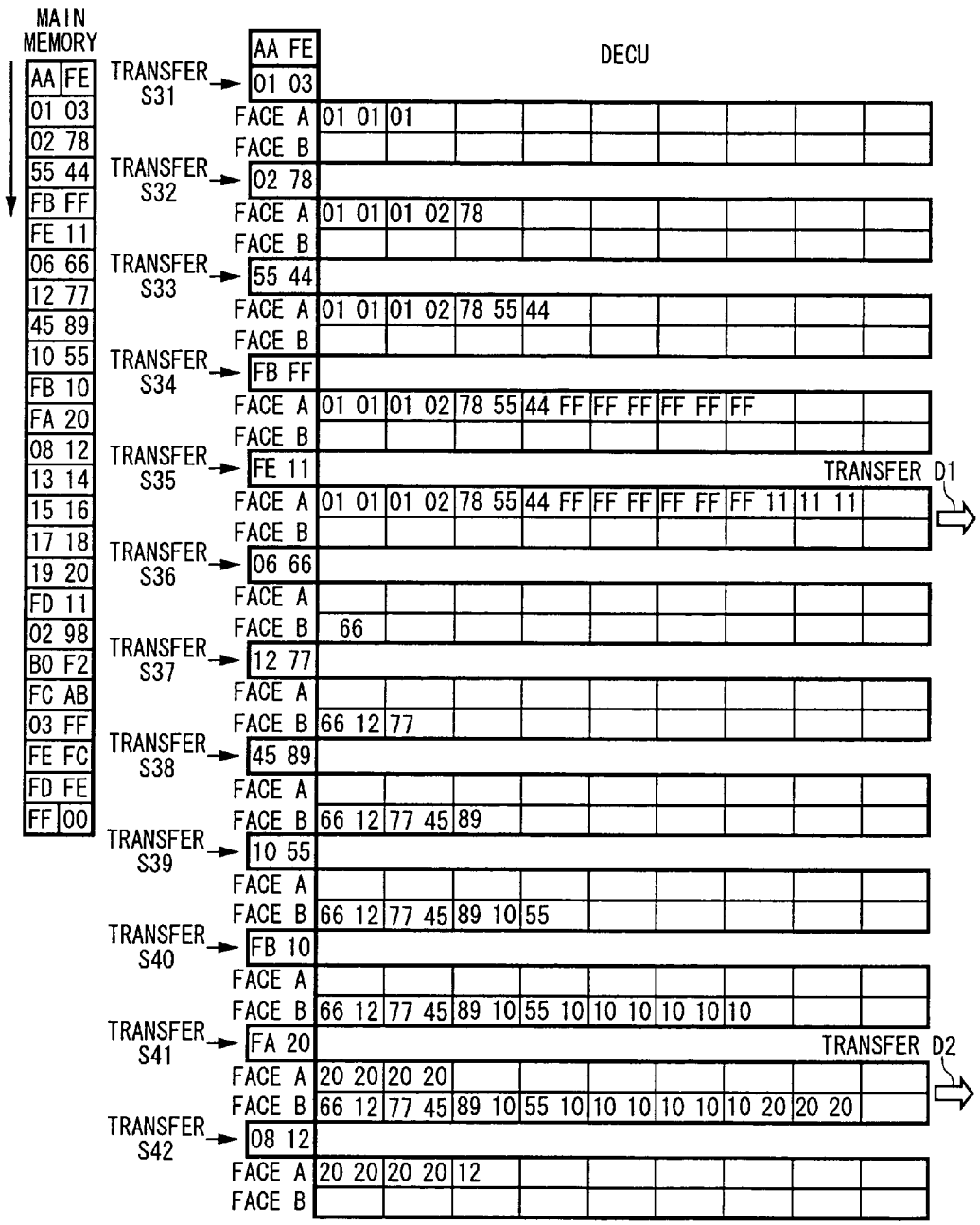
FIG. 11 is a diagram showing such flow as compressed recording data is developed.
Figure 12:
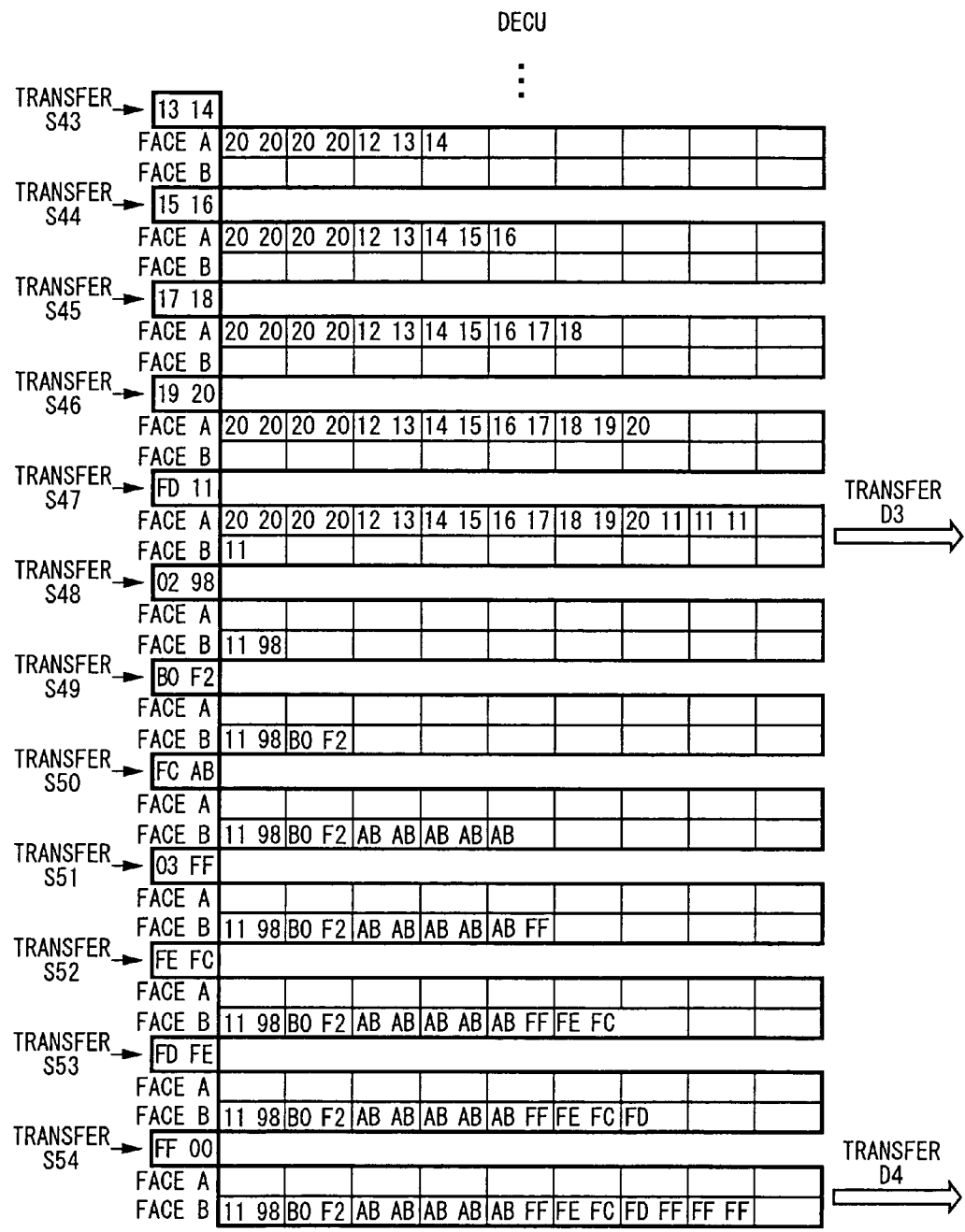
FIG. 12 is a diagram showing such flow as compressed recording data is developed.

FIG. 11 and FIG. 12 are diagrams schematically showing the state until the compressed recording data is developed in the decode circuit 28 based on hardware and stored in the line buffer 281, in case the data starting address of the compressed recording data is an odd address.

The initial byte data (FEH) of the run length compressed recording data stored in the receiving buffer unit 42 (main memory) is stored in the upper address (odd address) of the initial word data. That is, in the lower address (even address) of the word data including this initial byte data, the data irrelevant to the recording data (AAH) is stored. However, if one word each is DMA-transferred from the receiving buffer unit 42 to the decode circuit 28, the even address cannot help but be initially transferred. Therefore, if the initial word data of the run length compressed recording data is developed as it is by the decode circuit 28 based on hardware, the development is performed in the state where the data irrelevant to the recording data is included, and thus it is impossible to surely develop the compressed recording data.

Here, in the development processing controller 412 (FIG. 6), the decode circuit 28 develops the irrelevant data of lower address (even address) of the word data including the initial byte data by nullifying it with masking. Further, if initial data of 1 word is developed by the decode circuit as it is, AAH becomes the count, and FEH becomes the data, so that FEH can be surely developed by nullifying AAH.

Next, the compressed recording data DMA-transferred to the decode circuit 28 is 01H and 03H (Transfer S31). The lower address (even address) of 01H is the data, besides the data of the previous count of FEH. Therefore, 01H is repeatedly developed 3 times (257−254=3), and stored in order in the A side of the line buffer 281. And, the upper address (odd address) of 03H is the count, and the next data (02H, 78H, 55H and 44H) of 4 bytes (3+1=4) is developed as it is without repetition, and stored in order in the A side of the line buffer 281 (Transfers S32 to S33). Then, in the same order as that of the first embodiment, the run length compressed recording data is developed one word each and stored in order in the line buffer 281 (Transfers S32 to S54), and when the developed recording data has been accumulated to be 1 line bytes (16 bytes) the data is DMA-transferred to the local memory 29 (Transfers D1 to D4). Further, it is preferable to judges whether the data starting address of the run length compressed recording data stored in the receiving buffer unit 42 is an odd address or not by, for example, a firmware program which is performed by the MPU 24.

In this way, although the data starting address of the run length compressed recording data stored in the receiving buffer unit 42 is an odd address, it is possible to accurately develop data from the first of the run length compressed recording data in the decode circuit 28 based on hardware.

Further, as a fourth embodiment of the inkjet type recording apparatus 50 relating to the present invention, added to the first to third embodiments described above, the number of bites of 1 line is an odd number.

Figure 13:
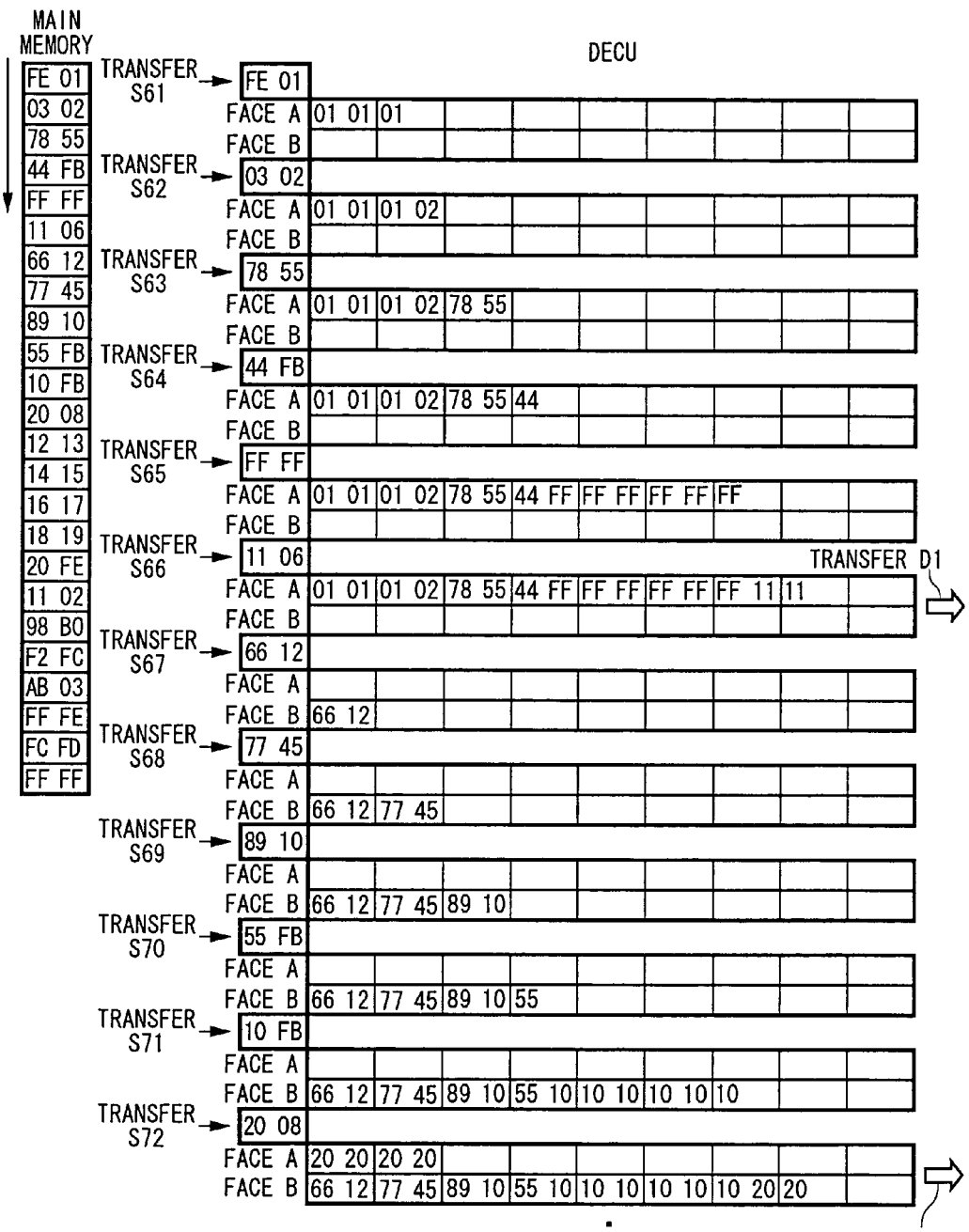
FIG. 13 is a diagram showing such flow as compressed recording data is developed.

FIG. 13 and FIG. 14 are diagrams schematically showing the state until the compressed recording data is developed in the decode circuit 28 based on hardware and stored in the line buffer 281, in case the quantity of 1 line is 15 bytes in regard to the first or second embodiment described above. In addition, FIG. 15 is a diagram schematically showing the state until the developed recording data is transferred and stored from the line buffer 281 to local memory 29 to be vertically rearranged in line in regard to the fourth embodiment, and FIG. 16 is a diagram schematically showing the state until the developed recording data is stored without being vertically rearranged in line.

As described above, since the developed recording data is DMA-transferred one word each from the line buffer 281 to the local memory 29, the storage of the developed recording data in the bitmap area of the local memory 29 is performed 1 word each, and thus the recording data of odd bytes cannot be DMA-transferred from the DECU 41 to the local memory 29. Here, in the development processing controller 412 (FIG. 6), the number of bytes of 1 line of the line buffer is set to be an odd number, in the present embodiment, 15 bytes, and when the developed recording data is accumulated to be 15 bytes in the A or B side of the line buffer 281 the DMA transfer to the local memory 29 is performed. Therefore, the upper address part (odd address part) of the word data including the recording data of 15 bytes gets DMA-transferred in the state of 00H (data storage ending position shifting means).

Transfers S61 to S64 will not be described because they are the same as the Transfers S1 to S4 in the first embodiment (FIG. 7). Continuously, the compressed recording data DMA-transferred to the decode circuit 28 is FFH and FEH (Transfer S65). The lower address (even address) of FFH is the data, besides the data of the count of FBH. Therefore, FFH is repeatedly developed 6 times (257−251=6), and stored in order in the A side of the line buffer 281. And, the upper address (odd address) of FFH is the count, and the next data is repeatedly developed 2 times (257−255=2) and stored in order in the A side of the line buffer 281.

Continuously, the compressed recording data DMA-transferred to the decode circuit 28 is 11H and 06H (Transfer S66). The lower address (even address) of 11H is the data, besides the data of the previous count of FFH. Therefore, FFH is repeatedly developed 2 times, and stored in order in the A side of the line buffer 281. And, the upper address (odd address) of 06H is the count, and the next data (66H, 12H, 77H, 45H, 89H, 10H and 55H) of 7 bytes (6+1=7) is developed as it is without repetition, and stored in order in the B side of the line buffer 281 (Transfers S67 to S70).

In the mean time, when the developed recording data has been accumulated to be the number of bytes of 1 line in the A side of the line buffer 281, namely, 15 bytes (at the Transfer S66), the 15 bytes are DMA-transmitted to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D1). The recording data of 1 line transferred to the local memory 29 is vertically rearranged in line by the data rearranging means described above and stored 1 word each in order in the predetermined bitmap area of the local memory 29 at the first of the even address from the lower address (FIG. 15A). In addition, if the data is not vertically rearranged in line, then it is stored in order as it is (FIG. 16A). Then, in the same way, the run length compressed recording data is developed by the decode circuit 28 based on hardware (Transfers S71 to S84), and when the recording data developed in the line buffer 281 has been accumulated to be 1 line bytes (15 bytes) the data is DMA-transferred to the local memory 29 (Transfers D2 to D4).

Figure 17:
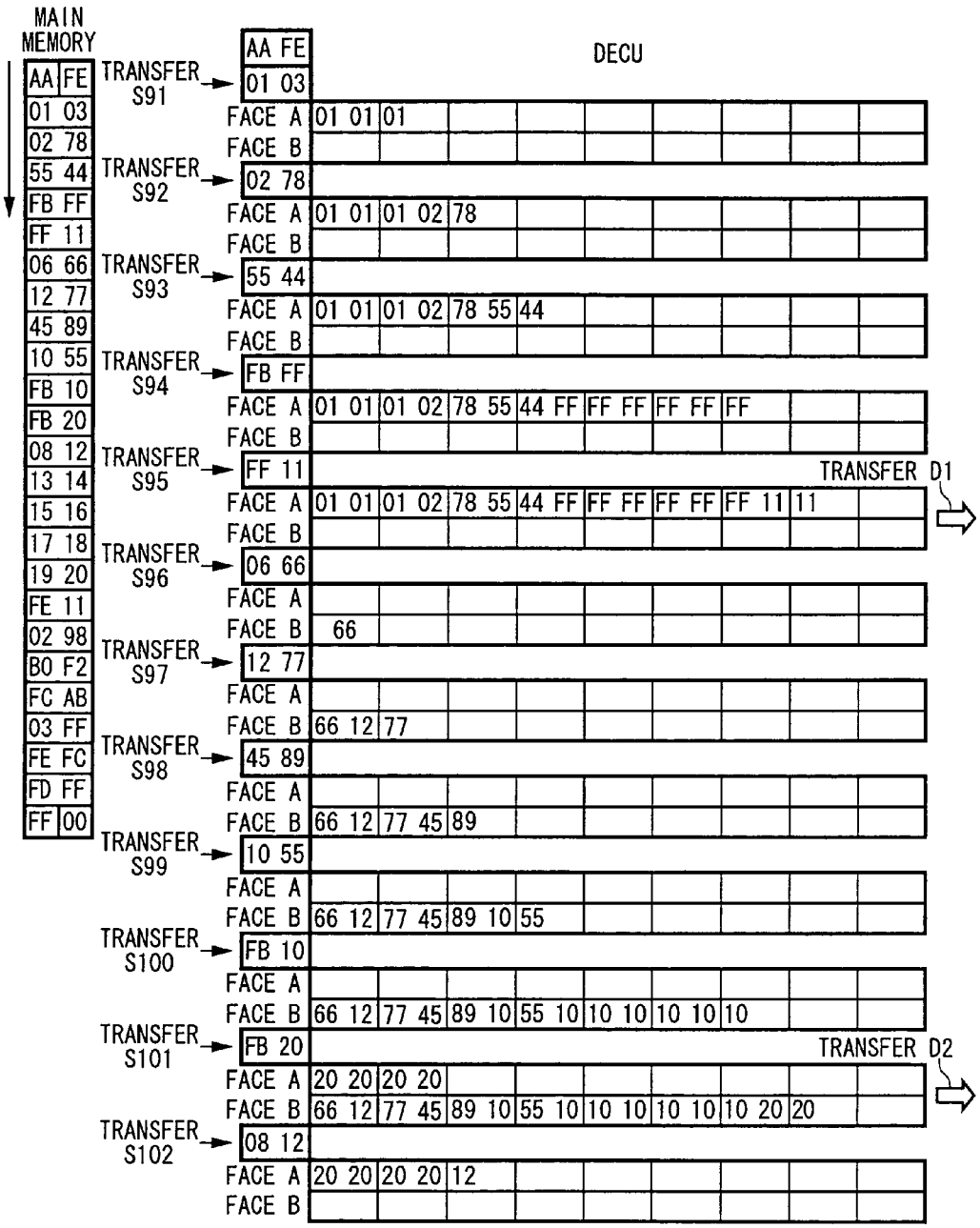
FIG. 17 is a diagram showing such flow as compressed recording data is developed.
Figure 18:
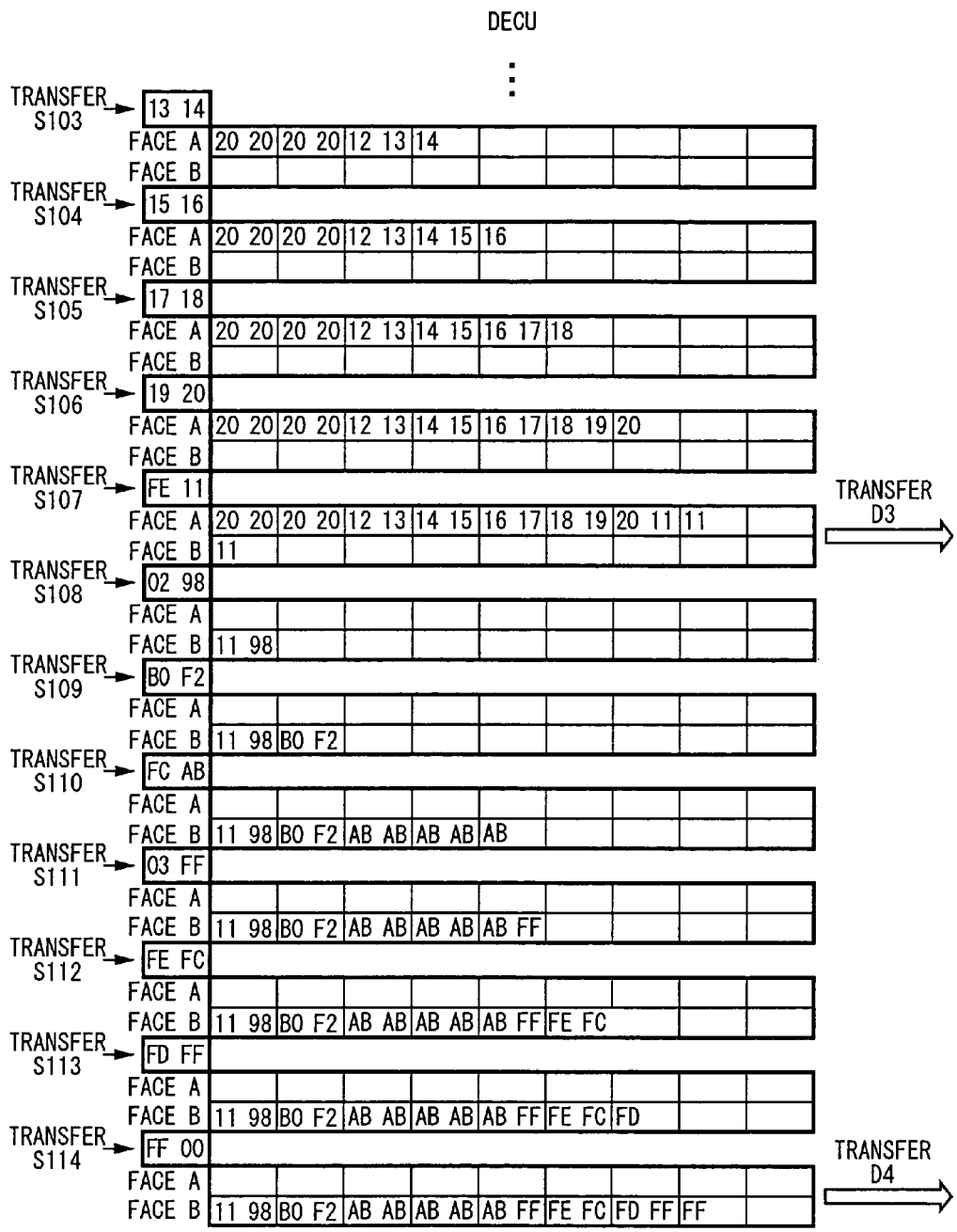
FIG. 18 is a diagram showing such flow as compressed recording data is developed.

FIG. 17 and FIG. 18 are diagrams schematically showing the state until the compressed recording data is developed in the decode circuit 28 based on hardware and stored in the line buffer 281, in case the quantity of 1 line is 15 bytes in regard to the third embodiment described above.

Transfers S91 to S94 will not be described because they are the same as the Transfers S31 to S34 in the second embodiment (FIG. 11). Continuously, the compressed recording data DMA-transferred to the decode circuit 28 is FFH and 11H (Transfer S95). The lower address (even address) of FFH is the count, and the upper address (odd address) of 11H is the data. Therefore, 11H is repeatedly developed 2 times (257−255=2), and stored in order in the A side of the line buffer 281.

And, when the developed recording data has been accumulated to be the number of bytes of 1 line in the A side of the line buffer 281, namely, 15 bytes (at the Transfer S95), the 15 bytes are DMA-transmitted to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D1). The recording data of 1 line transferred to the local memory 29 is vertically rearranged in line by the data rearranging means described above and stored 1 word each in order in the predetermined bitmap area of the local memory 29 at the first of the even address from the lower address (FIG. 15A). In addition, if the data is not vertically rearranged in line, then it is stored in order as it is (FIG. 16A). Then, in the same way, the run length compressed recording data is developed by the decode circuit 28 based on hardware (Transfers S71 to S84), and when the recording data developed in the line buffer 281 has been accumulated to be 1 line bytes (15 bytes) the data is DMA-transferred to the local memory 29 (Transfers D2 to D4).

In this way, since the recording data is DMA-transferred to the local memory 29 when the recording data developed in the line buffer 281 has been accumulated to be odd bytes, the transfer is performed while the upper address of the last word data is 00H, and thus the developed recording data can be stored in the bitmap area of the local memory 29 in order that the last 1 byte of 1 line is 00H and the recording data of 1 line is odd bytes as the data starting address is an even address as shown in FIG. 15D and FIG. 16D.

Further, as a fifth embodiment of the inkjet type recording apparatus 50 relating to the present invention, added to the second to fourth embodiments described above, the recording data is stored in the bitmap area of the local memory 29 in order that the recording data of 1 line is odd bytes as the data starting address is an even address.

In the nozzle arrays arranged in numbers and provided on the recording head 62, the colors of ink which is ejected are determined for each of the nozzle arrays. In the mean time, the recording data stored in the bitmap area of the local memory 29 becomes the data for each of the colors of ink corresponding to each of the nozzle arrays of each line. And, in regard to a means for correcting the lag of the ink ejecting timing caused by the nozzle arrays, there is a case that it is necessary to store the recording data of 1 line in the bitmap area of the local memory 29 letting the initial address be an odd address.

However, as described above, by DMA-transmitting one word each from the receiving buffer unit 42 to the decode circuit 28, the recording data developed in the bitmap area of the local memory 29 is stored while an even address is always positioned at the first, and thus in this state the recording data cannot be stored while an odd address is positioned at the first. Here, in the development controller 412 (FIG. 6), when the recording data developed in the decode circuit 28 is stored in the line buffer 281, it is stored from the 1-th byte of the line buffer 281 in the state where the 0-th byte is vacant (data storage starting position shifting method). That is, when the developed recording data is stored in the line buffer 281 after the compressed recording data is developed in the decode circuit 28, it is stored from the 1-th byte of the line buffer 281 in the state where the 0-th byte is vacant, and the developed recording data stored in the line buffer 281 is DMA-transferred to the bitmap area of the local memory 29 from the 0-th byte of the line buffer 281.

Figure 19:
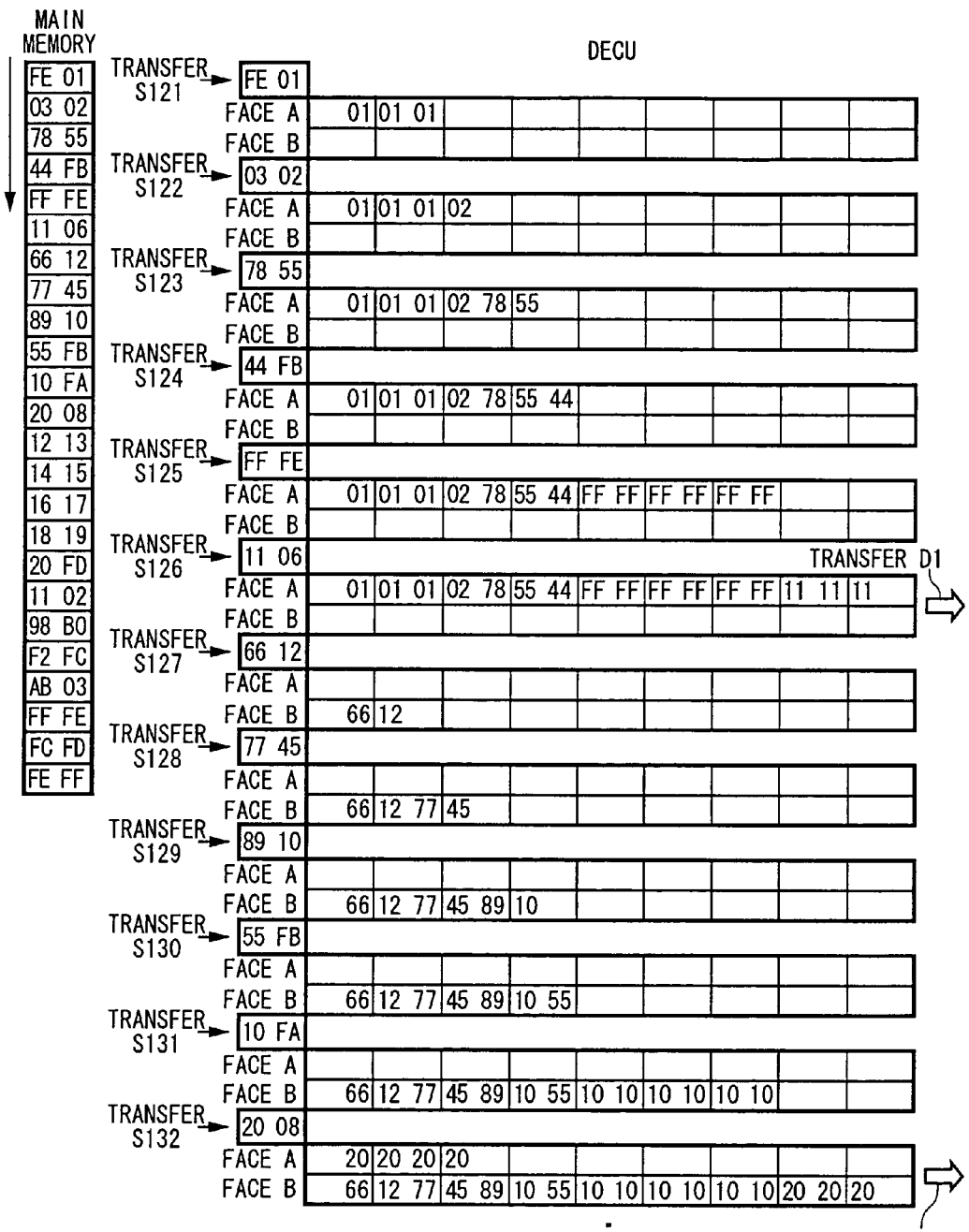
FIG. 19 is a diagram showing such flow as compressed recording data is developed.
Figure 20:
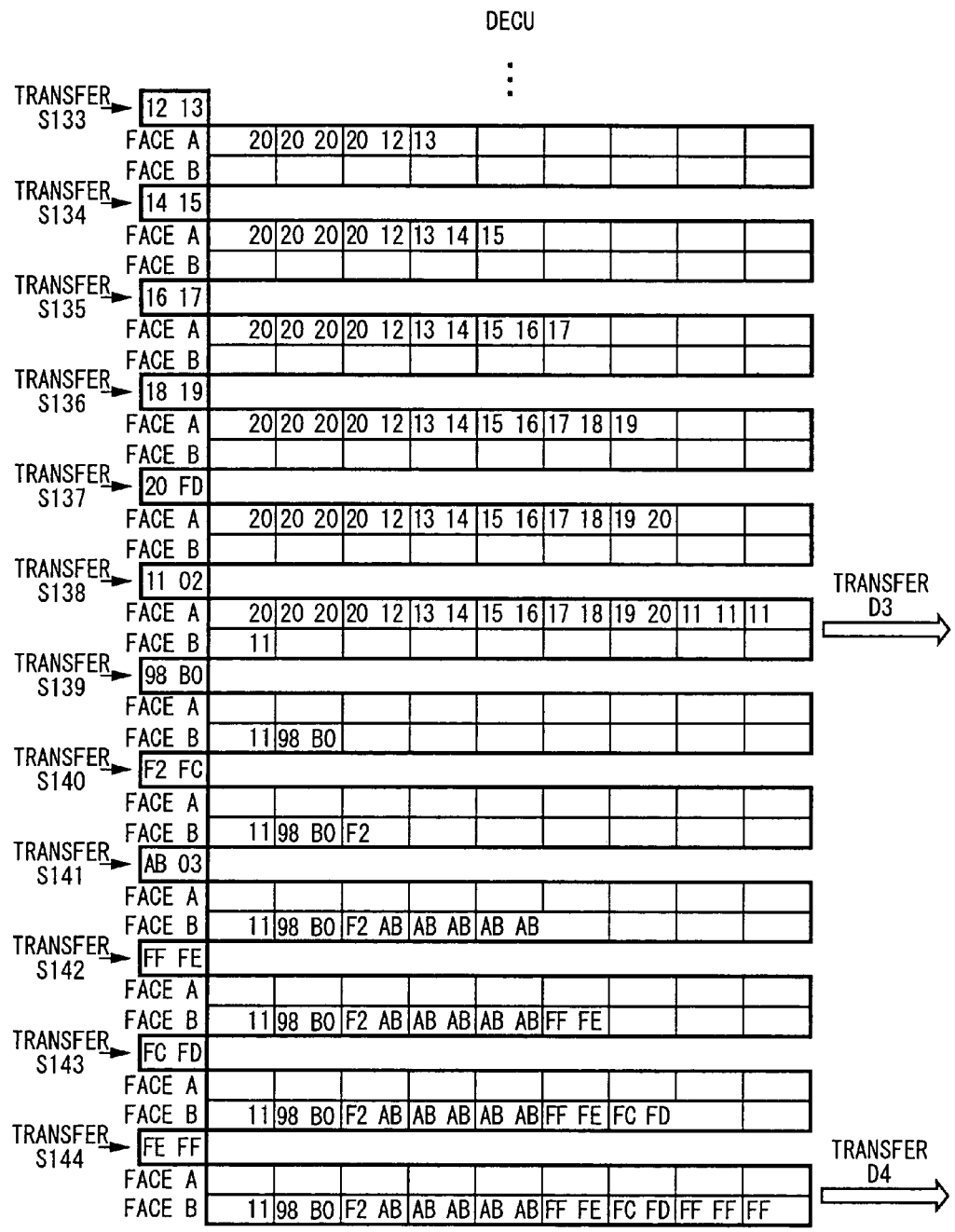
FIG. 20 is a diagram showing such flow as compressed recording data is developed.

FIG. 19 and FIG. 20 are diagrams schematically showing the state until the compressed recording data is developed in the decode circuit 28 based on hardware and stored in the line buffer 281, in case the recording data is developed from the 1-th byte of the line buffer 281 in the state where the 0-th byte is vacant in regard to the second embodiment described above. In addition, FIG. 21 is a diagram schematically showing the state until the developed recording data of 1 line, 16 bytes, is transferred from the line buffer 281 to the local memory 29, and vertically rearranged in line and stored while an odd address comes first.

As described above, the line buffer 281 has a reserve storage area of 1 word (2 bytes) which is added to the storage area of 8 words (16 bytes) for both of the A and B sides. The recording data developed 1 word each in the decode circuit 28 is stored from the 1-th byte in the state where the 0-th byte of the A side of the line buffer is vacant. And, the 16-th byte of the recording data, which cannot help but be forced out from the storage area as the 0-th byte is made vacant, gets stored in the reserve storage area.

When the developed recording data has been accumulated to be 16 bytes in the A side of the line buffer 281, the 18 bytes (9 words) of the recording data in total, that is, the 16 bytes in the storage area and the data in the reserve storage area are DMA-transmitted to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D1). The recording data of 1 line transferred to the local memory 29 is vertically rearranged in line by the data rearranging means described above and stored 1 word each in order in the predetermined bitmap area of the local memory 29 at the first of the even address from the lower address (FIG. 21A). Therefore, since data to which the vacant data of 1 byte at the first is DMA-transferred to the local memory 29 and stored at the even address of the bitmap area, the initial data of the recording data of 1 line gets to be stored from the even address.

Then, in the same way, the run length compressed recording data is developed by the decode circuit 28 based on hardware, and when the recording data developed in the line buffer 281 has been accumulated to be 1 line bytes, 16 bytes, the data is DMA-transferred to the local memory 29 (Transfers D2 to D4). Further, transfers S121 to S144 will not be described because they are the same as the Transfers S1 to S24 shown in FIG. 7.

In this way, since the recording data developed one word each in the decode circuit 28 is stored from the 1-th byte of the line buffer 281 in the state where the 0-th byte of the A side of the line buffer 281 is vacant, and it is DMA-transferred to the local memory 29 when the developed recording data of 16 bytes has been stored, the transfer is performed while the lower address of the first word data is 00H, and thus the developed recording data can be stored in the bitmap area of the local memory 29 in order that the first 1 byte of 1 line is 00H and the recording data of 1 line is odd bytes as the data starting address is an even address as shown in FIG. 21D.

Figure 22:
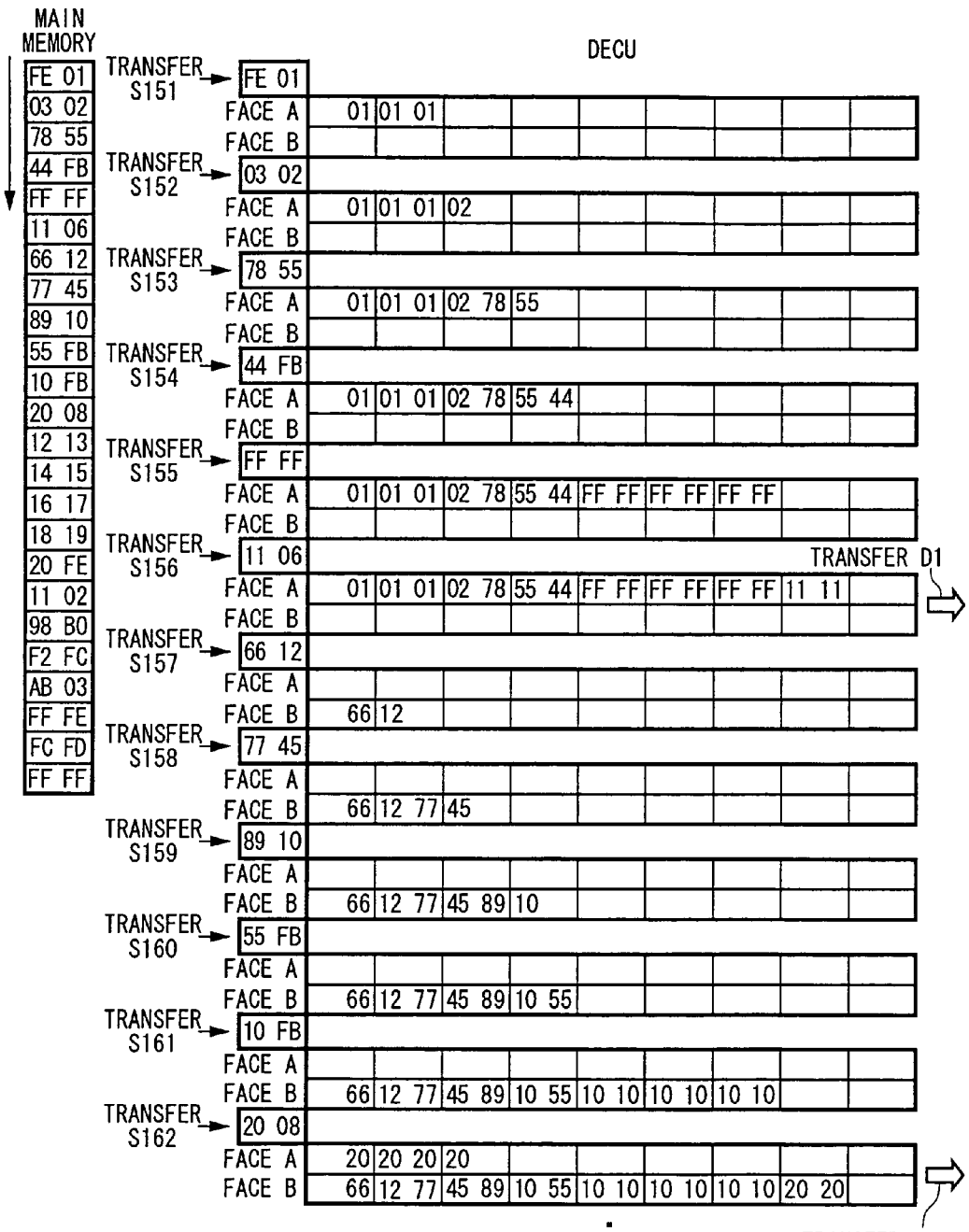
FIG. 22 is a diagram showing such flow as compressed recording data is developed.
Figure 23:
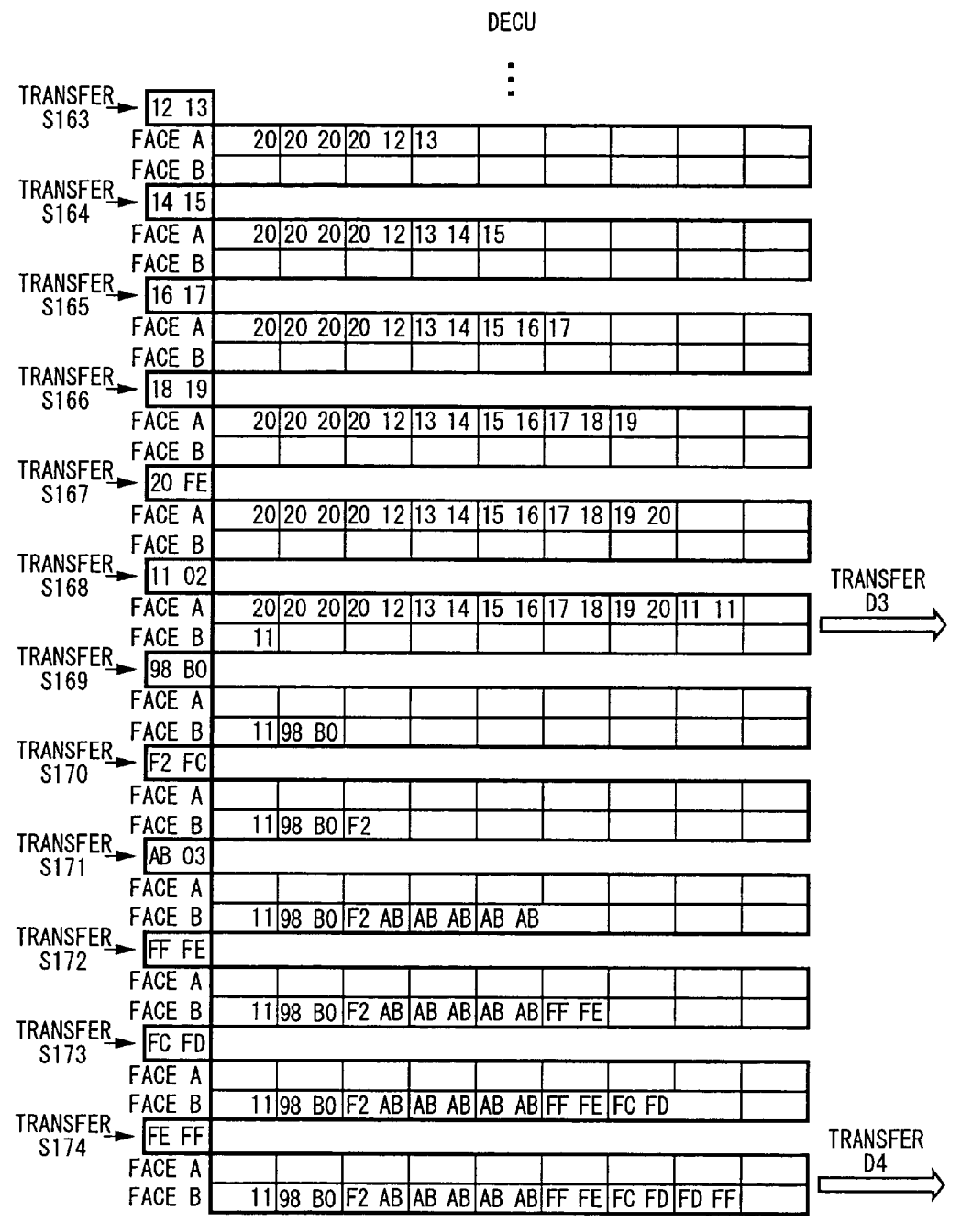

FIG. 22 and FIG. 23 are diagrams schematically showing the state until the compressed recording data is developed in the decode circuit 28 based on hardware and stored in the line buffer 281, in case the recording data is developed from the 1-th byte of the line buffer 281 in the state where the 0-th byte is vacant in regard to the fourth embodiment described above. In addition, FIG. 24 is a diagram schematically showing the state until the developed recording data of 1 line, 15 bytes, is transferred from the line buffer 281 to the local memory 29, and vertically rearranged in line and stored while an odd address comes first.

In this way, the number of 1 line bytes can be 15 bytes, that is, odd bytes. Therefore, as shown in FIG. 24D, the storage in the bitmap area of the local memory 29 can be performed in order that the first 1 byte of 1 line is 00H and the data starting address of the recording data of 1 line, 15 bytes, is an even address.

Figure 25:
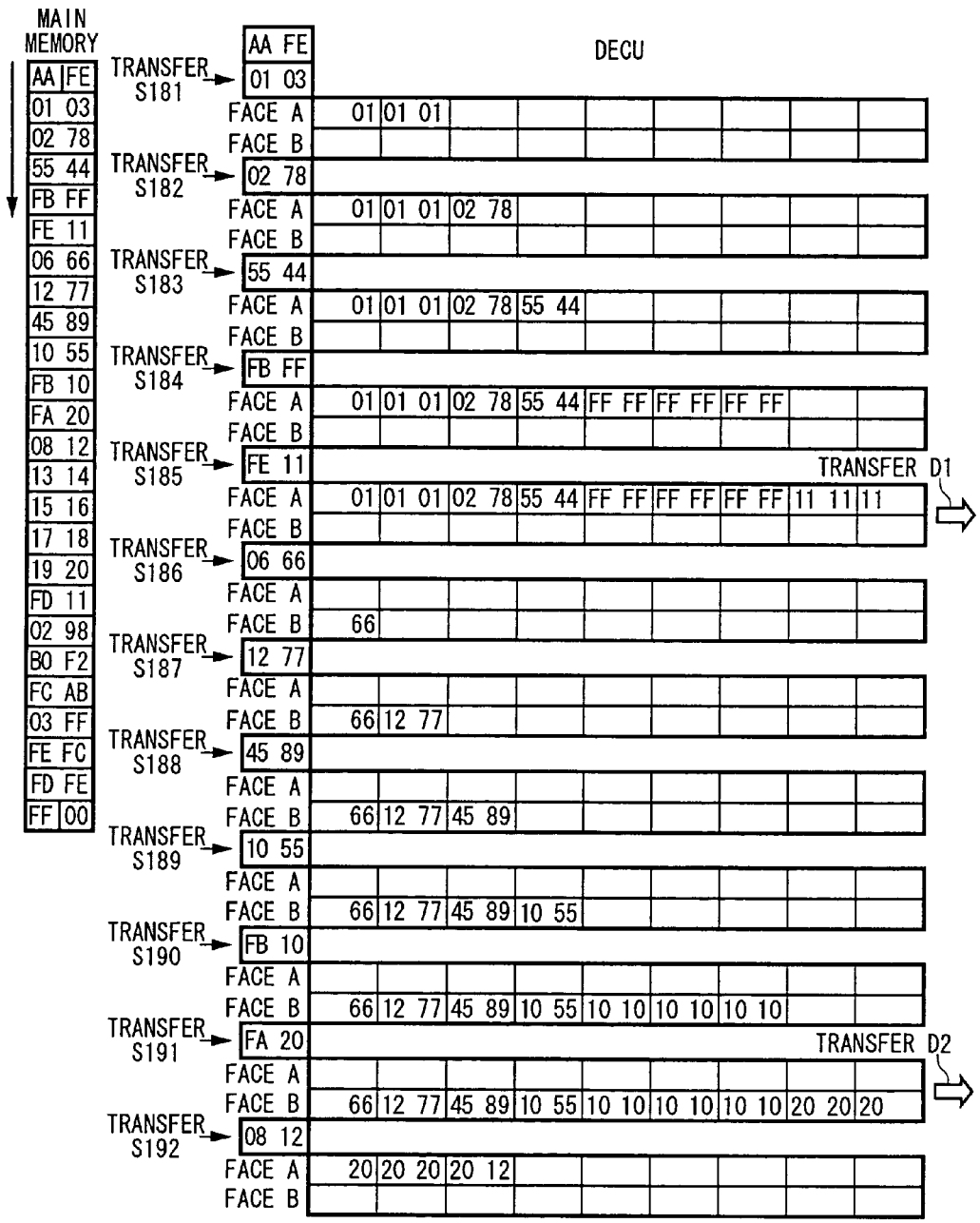
FIG. 25 is a diagram showing such flow as compressed recording data is developed.
Figure 26:
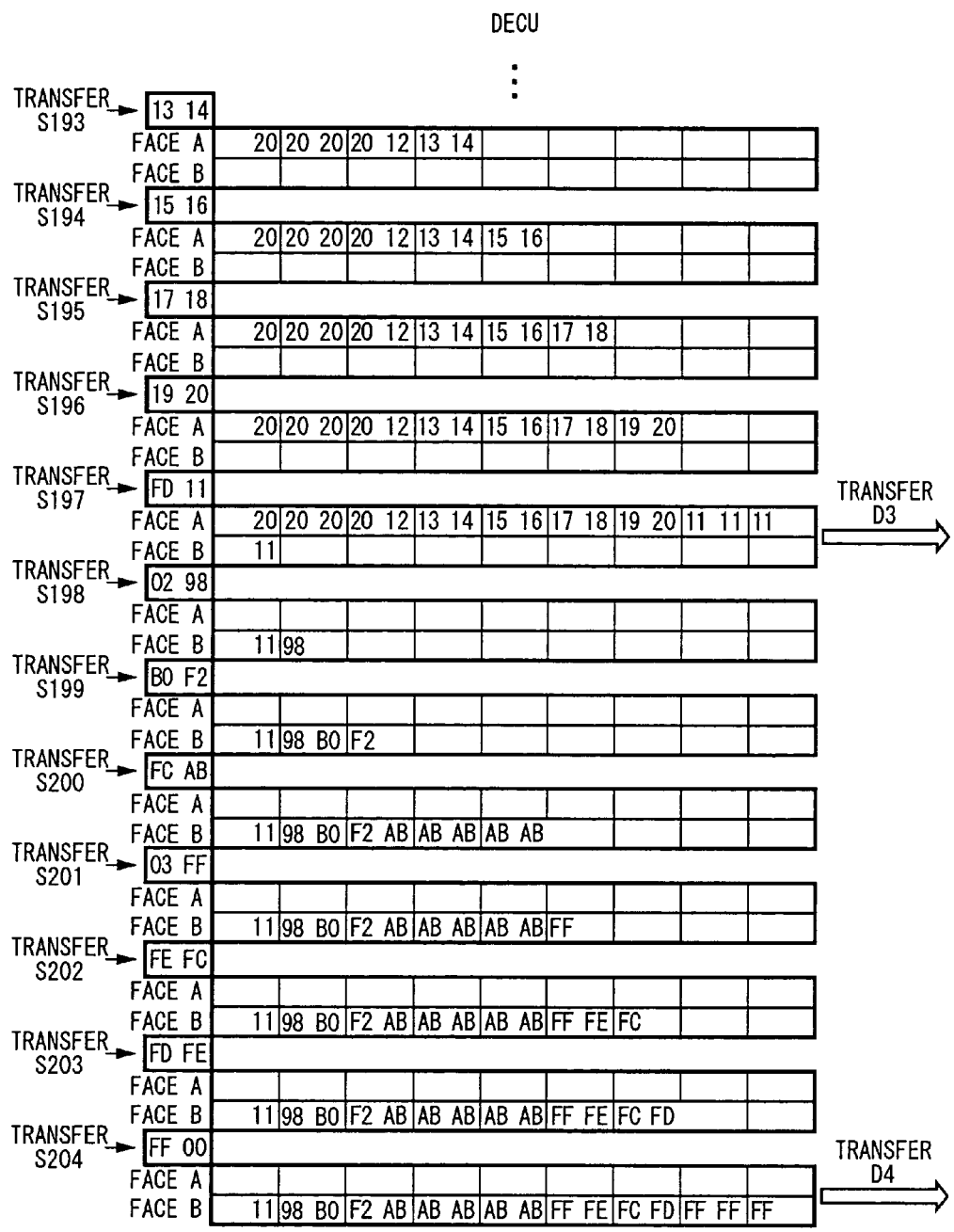
FIG. 26 is a diagram showing such flow as compressed recording data is developed.
Figure 27:
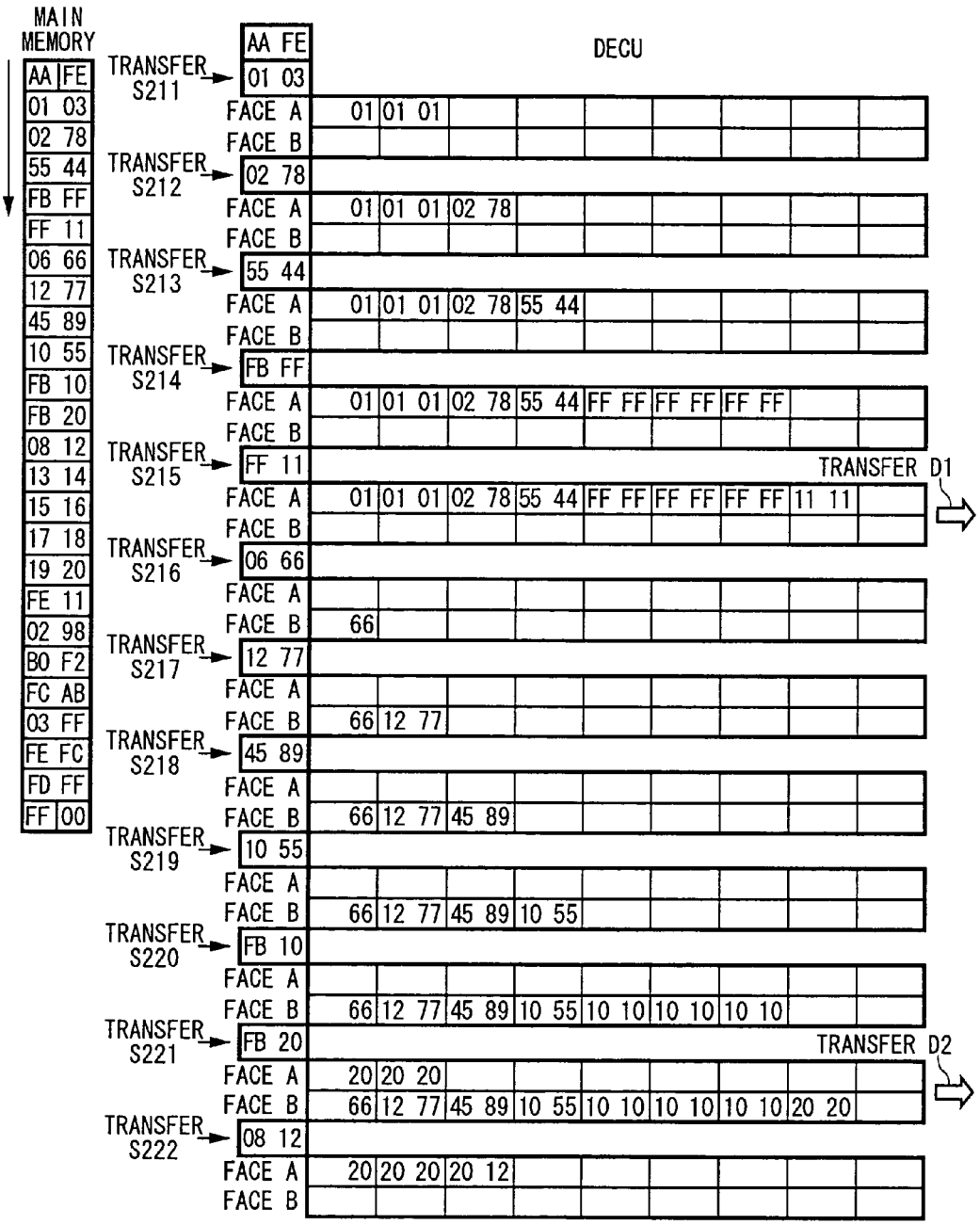
FIG. 27 is a diagram showing such flow as compressed recording data is developed.
Figure 28:
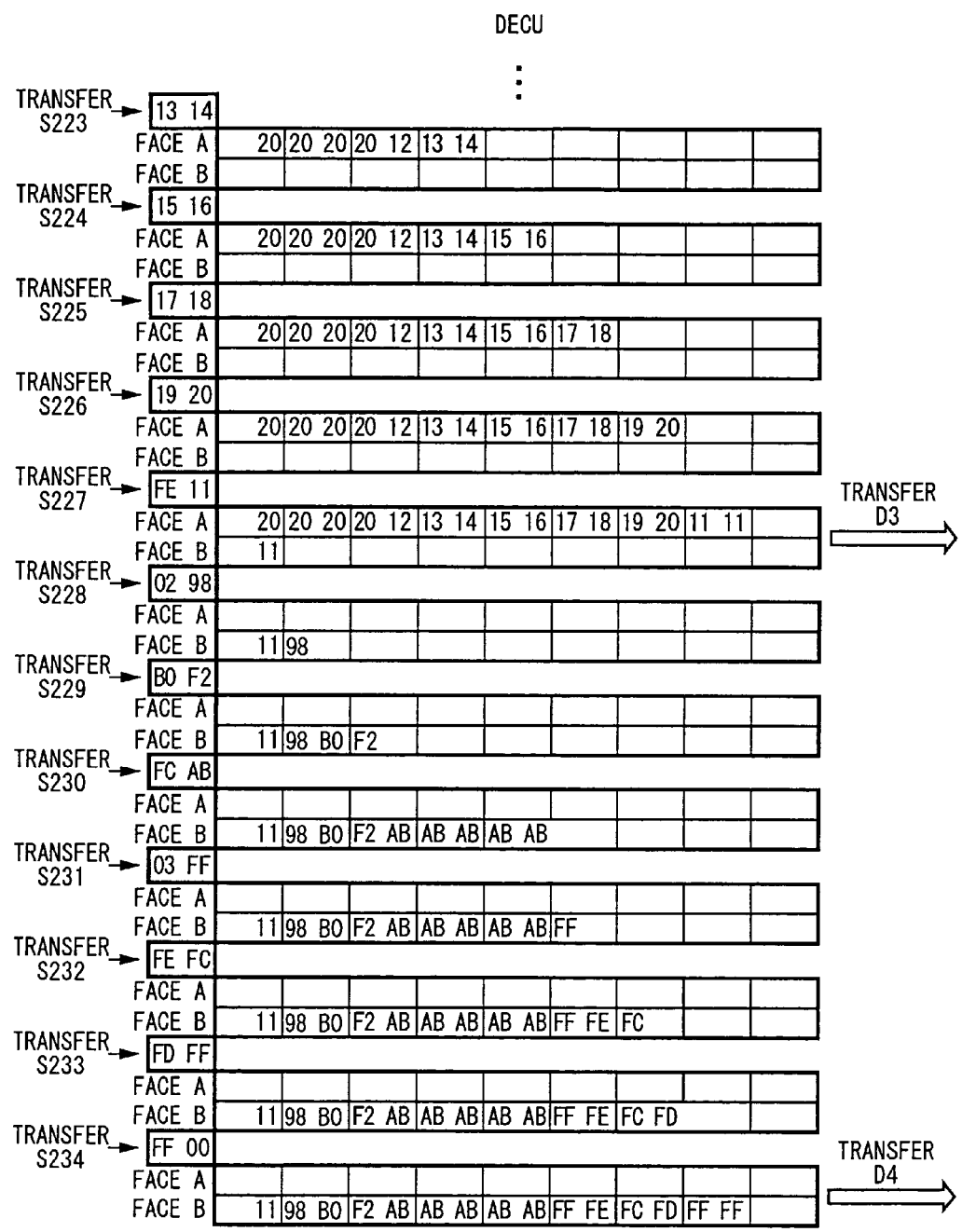
FIG. 28 is a diagram showing such flow as compressed recording data is developed.

In addition, FIG. 25 and FIG. 26 are diagrams schematically showing the state until the compressed recording data is developed in the decode circuit 28 based on hardware and stored in the line buffer 281, in case the recording data is developed from the 1-th byte of the line buffer 281 in the state where the 0-th byte is vacant in regard to the third embodiment described above and the recording data of 1 line is 16 bytes. In the same way, FIG. 27 and FIG. 28 shows ones in case the recording data is developed from the 1-th byte of the line buffer 281 in the state where the 0-th byte is vacant in regard to the third embodiment described above and the recording data of 1 line is 15 bytes.

In this way, after the compressed recording data stored in the receiving buffer unit 42 while an odd address comes first is developed in the decode circuit 28, the recording data of 1 line, 15 or 16 bytes, can be stored in the bitmap area of the local memory 29 while an odd address comes first.

Further, as a sixth embodiment of the inkjet type recording apparatus 50 relating to the present invention, added to any of the first to fifth embodiments described above, the developed recording data is stored in two different bitmap areas of the local memory 29. FIG. 29 is a diagram schematically showing the state until the developed recording data of 1 line, 16 bytes, is transferred from the line buffer 281 to the local memory 29, and vertically rearranged in line and stored in the two different bitmap areas while an even address comes first.

If a dot interval of the sub scanning direction Y in regard to the developed bitmap data is smaller than an interval of the nozzle arrays adjacent to the sub scanning direction Y, the ink dots adjacent to the sub scanning direction Y cannot be formed simultaneously by one main scan, and thus it is formed during a different main scanning operation. However, since the bitmap data developed in the decode circuit 28 has a data configuration by which the ink ejection data formed to be adjacent to the sub scanning direction Y is continuously arranged, recording cannot be performed while the developed bitmap data is transferred to the recording head 62 as it is. For this reason, it is necessary to divide the developed bitmap data in order that the ink dot data adjacent to the sub scanning direction Y can be transferred to the recording head 62 during a different main scanning operation while it is stored in a different bitmap area.

In this regard, two different bitmap areas are provided in the local memory beforehand. In this embodiment, they are represented by image 1 and image 2 respectively. In regard to the bitmap area of the local memory 29 which is the DMA transfer destination, the transfer destination addresses are individually set for each one word of the developed recording data stored in the line buffer 281 in the development processing controller 41 (FIG. 6) in order that the data of 1 line is stored in the image 1and the image 2 in turn. And, the L-DMA controller 413 (FIG. 6) in the DECU 41 sets the individual transfer destination address to be the transfer destination address of DMA transfer, and DMA-transfers the developed recording data stored in the line buffer 281 to local memory 29 one word each (data dividing means).

First, when the developed recording data has been accumulated in the A side of the line buffer 281 to be 1 line of 16 bytes, the recording data of 1 line is DMA-transferred to the local memory 29 (Transfer D1), and stored in the image 1 (FIG. 29A. Continuously, when the developed recording data has been accumulated in the B side of the line buffer 281 to be 1 line of 16 bytes, the recording data of 1 line is DMA-transferred to the local memory 29 (Transfer D2), and stored in the image 2 (FIG. 29B. Continuously, when the developed recording data has been accumulated in the A side of the line buffer 281 to be 1 line of 16 bytes, the recording data of 1 line is DMA-transferred to the local memory 29 (Transfer D3), and stored in the image 1 (FIG. 29C). Continuously, when the developed recording data has been accumulated in the B side of the line buffer 281 to be 1 line of 16 bytes, the recording data of 1 line is DMA-transferred to the local memory 29 (Transfer D4), and stored in the image 2 (FIG. 29D).

In this way, the developed recording data stored in the line buffer 281 after the compressed recording data is developed is DMA-transferred to the different bitmap areas of the local memory 29 one line each in order that each of the ink dots adjacent to the sub scanning direction Y is formed during the different main scanning operations respectively. Owing to this, the development process of the compressed recording data (in the decode circuit 28) and the division of the developed recording data (in the development processing controller 412) can be performed at high speed by a hardware process. In addition, FIG. 30 is a diagram schematically showing the state until the developed recording data of 1 line, 16 bytes, is transferred from the line buffer 281 to the local memory 29, and stored in the two different bit map areas, while an even address comes first, as it is without being vertically rearranged in line.

In addition, FIG. 31 is a diagram schematically showing the state until the developed recording data of 1 line, 16 bytes, is transferred from the line buffer 281 to the local memory 29, and vertically rearranged in line and stored in the two different bitmap areas, while an even address comes first. FIG. 32 is a diagram schematically showing the state until the developed recording data of 1 line, 15 bytes, is transferred from the line buffer 281 to the local memory 29, and stored in the two different bitmap areas, while an even address comes first, as it is without being vertically rearranged in line.

In this way, the developed recording data of odd bytes, as the number of bytes of 1 line is an odd number, is DMA-transferred to the local memory 29 when it has been stored in the line buffer 281, and thus the recording data of 1 line is transformed while the upper address of the last word data is 00H. Therefore, the developed recording data stored in the bitmap area of the local memory 29 is stored in the two different bitmap areas, the images 1 and 2, for each line in order that the last 1 byte of 1 line is 00H and the recording data of 1 line is odd bytes as the data starting address is an odd address.

In addition, FIG. 33 is a diagram schematically showing the state until the developed recording data of 1 line, 16 bytes, is transferred from the line buffer 281 to the local memory 29, and vertically rearranged in line and stored in the two different bitmap areas, while an odd address comes first. FIG. 34 is a diagram schematically showing the state until the developed recording data of 1 line, 15 bytes, is transferred from the line buffer 281 to the local memory 29, and vertically rearranged in line and stored in the two different bitmap areas, while an odd address comes first.

In this way, since the recording data developed one word each in the decode circuit 28 is stored from the 1-th byte of the line buffer 281 in the state where the 0-th byte of the A side of the line buffer 281 is vacant, and it is DMA-transferred to the local memory 29 when the developed recording data of 16 bytes has been stored, the transfer is performed while the lower address of the first word data is 00H, and thus the recording data can be stored in each of the two different bitmap areas, the image 1 and the image 2, of the local memory 29 in order that the first 1 byte of 1 line is 00H and the data starting address of the recording data of 1 line is an odd address.

Figure 35:
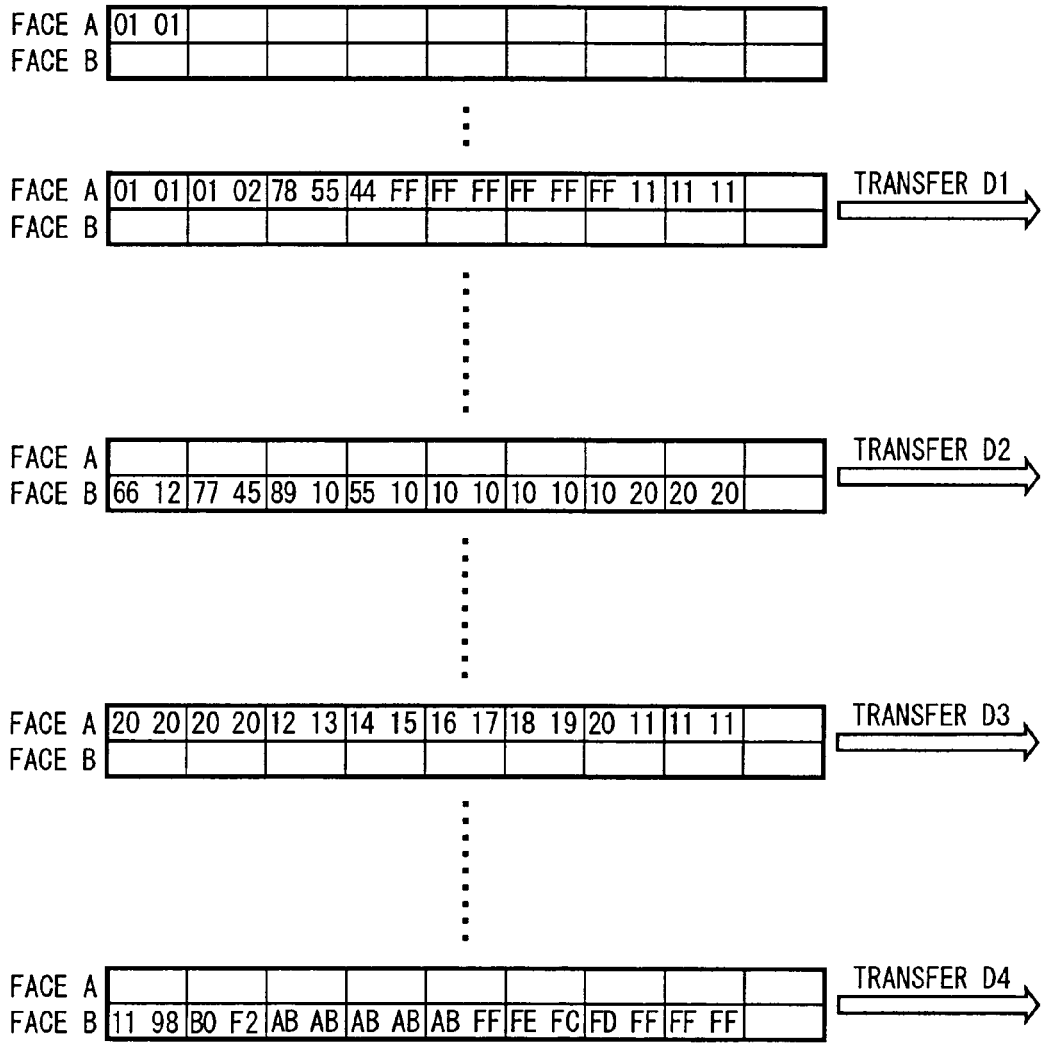
FIG. 35 is a diagram showing the state in which uncompressed data is transferred.
Figure 36:
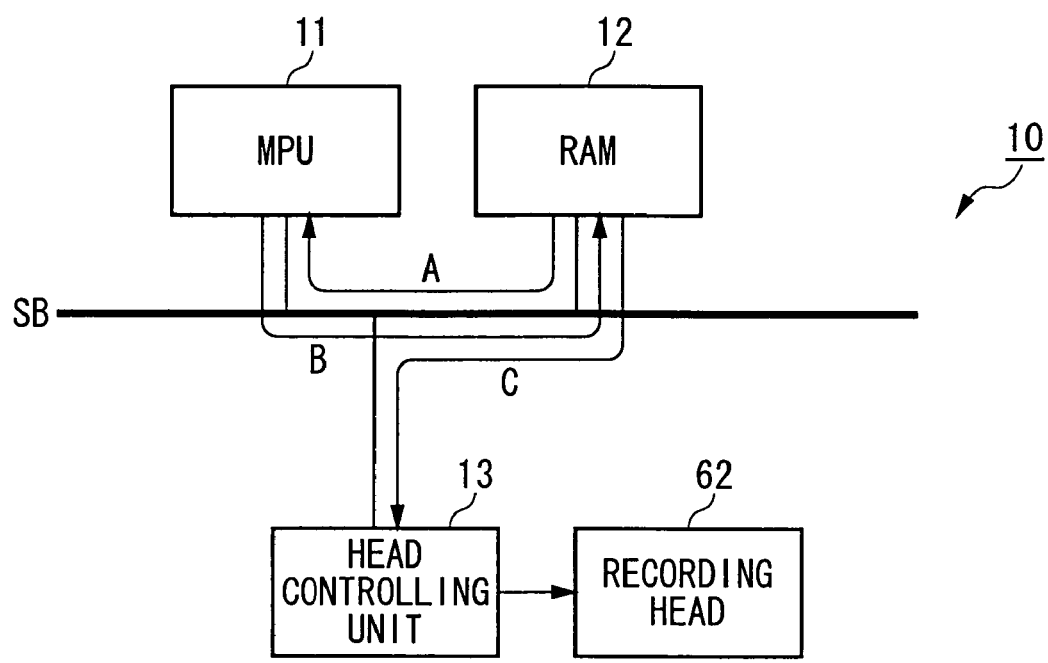
FIG. 36 is a block diagram showing a data transferring apparatus in regard to the prior art.

Further, as a seventh embodiment of the inkjet type recording apparatus 50 relating to the present invention, in regard to any of the first to sixth embodiments described above, if the recording data stored in the receiving buffer unit 42 is uncompressed data, it is stored in the bitmap area without development process. FIG. 35 is a diagram schematically showing the state where the uncompressed recording data is stored in the line buffer 281 as it is, and DMA-transferred to the local memory 29.

In this way, if the recording data transferred from the information processing apparatus 200 to the receiving buffer unit 42 is uncompressed data, it is stored in the line buffer 281 one word each as it is without development process by the decode circuit 28. And then, like the case that the compressed recording data is developed by the decode circuit 28, in regard to the development processing controller (FIG. 6), the recording data can be, as shown by the second to sixth embodiments described above, stored in the two different bitmap areas by being rearranged or being stored in the local memory 29 as the initial address is an odd address, while 1 line bytes are set to be 16 or 15 bytes.

Although the present invention has been described by way of exemplary embodiments, it should be understood that those skilled in the art might make many changes and substitutions without departing from the spirit and the scope of the present invention which is defined only by the appended claims.

What is claimed is:

1. A data transferring apparatus of liquid ejection data, comprising:
   two independent buses which are a system bus and a local bus;
   a main memory coupled to said system bus, capable of transferring data;
   a local memory coupled to said local bus, capable of transferring data; and
   a decode unit comprising:
   a decode circuit coupled between said system bus and said local bus, capable of transferring data mutually and developing liquid ejection data compressed to be developed in line based on hardware;
   a line buffer for storing liquid ejection data developed by said decode circuit per word unit; and
   a DMA-transferring means for DMA-transferring liquid ejection data compressed to be developed in line from said main memory to said decode circuit, DMA-transferring liquid ejection data developed in said line buffer to said local memory per word unit and DMA-transferring developed liquid ejection data stored in said local memory to a register of a liquid ejection head sequentially, wherein said line buffer comprises two side buffer areas capable of storing developed data of predetermined words, wherein liquid ejection data developed by said decode circuit is sequentially stored in one of said side buffer areas and liquid ejection data developed by said decode circuit is sequentially stored in the other of said side buffer areas when developed data of predetermined words has been accumulated, while developed data of predetermined words is DMA-transferred to said local memory for each predetermined words when developed data of predetermined words has been accumulated.

2. A data transferring apparatus of liquid ejection data as claimed in claim 1, wherein registers of said main memory, said decode unit and said liquid ejection head are incorporated in an ASIC as a circuit block, and registers of said decode unit and said liquid ejection head are coupled through an exclusive bus in said ASIC.

3. A data transferring apparatus of liquid ejection data as claimed in claim 1, wherein data transfers with respect to said local bus from said decode circuit to said local memory and from said local memory to a register of said liquid ejection head are performed in a burst transfer.

4. A data transferring apparatus of liquid ejection data as claimed in claim 1, wherein said compressed liquid ejection data is run length compressed data, and said decode circuit is capable of developing run length compressed data based on hardware.

5. A data transferring apparatus of liquid ejection data comprising:
   two independent buses which are a system bus and a local bus;
   a main memory coupled to said system bus, capable of transferring data;
   a local memory coupled to said local bus, capable of transferring data; and
   a decode unit comprising:
   a decode circuit coupled between said system bus and said local bus, capable of transferring data mutually and developing liquid ejection data compressed to be developed in line based on hardware;

a line buffer for storing liquid ejection data developed by said decode circuit per word unit; and a DMA-transferring means for DMA-transferring liquid ejection data compressed to be developed in line from said main memory to said decode circuit, DMA-transferring liquid ejection data developed in said line buffer to said local memory per word unit and DMA-transferring developed liquid ejection data stored in said local memory to a register of a liquid ejection head sequentially, wherein said decode unit comprises a means for storing uncompressed liquid ejection data DMA-transferred from said main memory without being developed by said decode circuit based on hardware.

6. A liquid ejection apparatus comprising said data transferring apparatus of liquid ejection data as claimed in claim 1.

7. A data transferring apparatus of liquid ejection data as claimed in claim 3, further including a data rearranging means for vertically rearranging recording data transferred to the local memory.

8. A data transferring apparatus of liquid ejection data as claimed in claim 1, further including an invalid data mask processing means for nullifying the initial data of the run-length compressed data.

9. A data transferring apparatus of liquid ejection data as claimed in claim 1, wherein said DMA-transferring developed liquid ejection is changed and stored in a vertical direction.

10. A data transferring apparatus of liquid ejection data as claimed in claim 1, wherein when the developed liquid ejection data is stored in line buffer, the developed liquid ejection data is stored by a data storage starting position shifting method.

11. A data transferring apparatus of liquid ejection data as claimed in claim 5, wherein registers of said main memory, said decode unit and said liquid ejection head are incorporated in an ASIC as a circuit block, and registers of said decode unit and said liquid ejection head are coupled through an exclusive bus in said ASIC.

12. A data transferring apparatus of liquid ejection data as claimed in claim 5, wherein data transfers with respect to said local bus from said decode circuit to said local memory and from said local memory to a register of said liquid ejection head are performed in a burst transfer.

13. A data transferring apparatus of liquid ejection data as claimed in claim 5, wherein said compressed liquid ejection data is run length compressed data, and said decode circuit is capable of developing run length compressed data based on hardware.

14. A liquid ejection apparatus comprising said data transferring apparatus of liquid ejection data as claimed in claim 5.

* * * * *